United States Patent [19]
Yoshida et al.

[11] Patent Number: 5,677,581
[45] Date of Patent: Oct. 14, 1997

[54] STEPPING MOTOR WITH PROTRUDING POLE TEETH TO INCREASE DETENT TORQUE

[75] Inventors: Hirohiko Yoshida, Chita; Tetsuo Imamura, Toyoake; Kenji Morikawa, Kariya; Masayuki Yano, Chita-gun; Kenji Tange, Kariya, all of Japan

[73] Assignee: Nippondenso Co., Ltd., Kariya, Japan

[21] Appl. No.: 490,667

[22] Filed: Jun. 15, 1995

[30] Foreign Application Priority Data

| Jun. 16, 1994 | [JP] | Japan | 6-134240 |
| Sep. 6, 1994 | [JP] | Japan | 6-212702 |
| Oct. 3, 1994 | [JP] | Japan | 6-238890 |

[51] Int. Cl.$^6$ .............. H02K 37/12; H02K 21/12; H02K 1/14
[52] U.S. Cl. .................. 310/49 R; 310/156; 310/254
[58] Field of Search .................. 310/49 R, 156, 310/254, 257, 186, 187

[56] References Cited

U.S. PATENT DOCUMENTS

| 3,800,175 | 3/1974 | Plotscher et al. | 310/164 |
| 4,794,292 | 12/1988 | Torisawa | 310/257 |

FOREIGN PATENT DOCUMENTS

| 568347 | 11/1993 | European Pat. Off. |
| 1452023 | 12/1966 | France. |
| 2249599 | 4/1973 | Germany. |
| 54-23369 | 9/1979 | Japan. |
| 60-160363 | 8/1985 | Japan. |
| 1-136551 | 11/1987 | Japan. |
| 1-190248 | 7/1989 | Japan. |
| 6-14515 | 1/1994 | Japan. |
| 6-14516 | 1/1994 | Japan. |

*Primary Examiner*—Steven L. Stephan
*Assistant Examiner*—Christopher Cuneo
*Attorney, Agent, or Firm*—Cushman, Darby & Cushman IP Group of Pillsbury Madison & Sutro LLP

[57] ABSTRACT

A stepping motor according to the present invention comprises a cylindrical permanent magnet on whose outer periphery N and S poles are alternately polarized, a rotatably-supported rotor, a plurality of stator cores having pole teeth arranged so as to face the permanent magnet, an exciting coil for rotating the rotor when the coil is turned on, and at least two protruded teeth serving as auxiliary poles which face the cylindrical surface of the permanent magnet so as to generate a detent torque when it is magnetized by the permanent magnet. And each of the protruded teeth faces the consecutive N an S poles of the permanent magnet.

22 Claims, 20 Drawing Sheets

FIG. 4
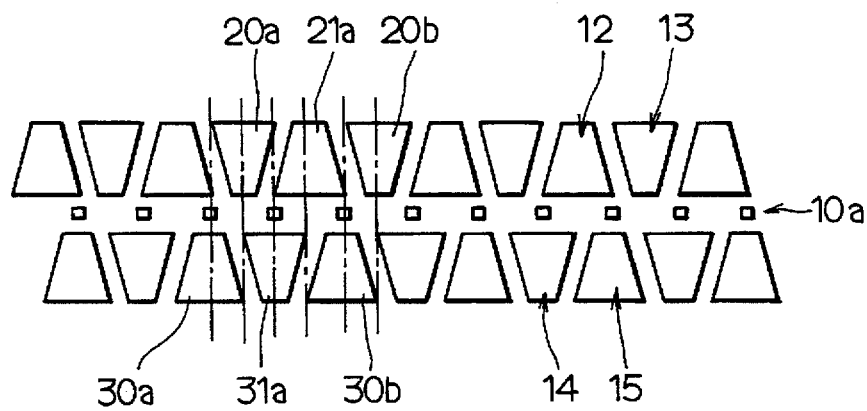
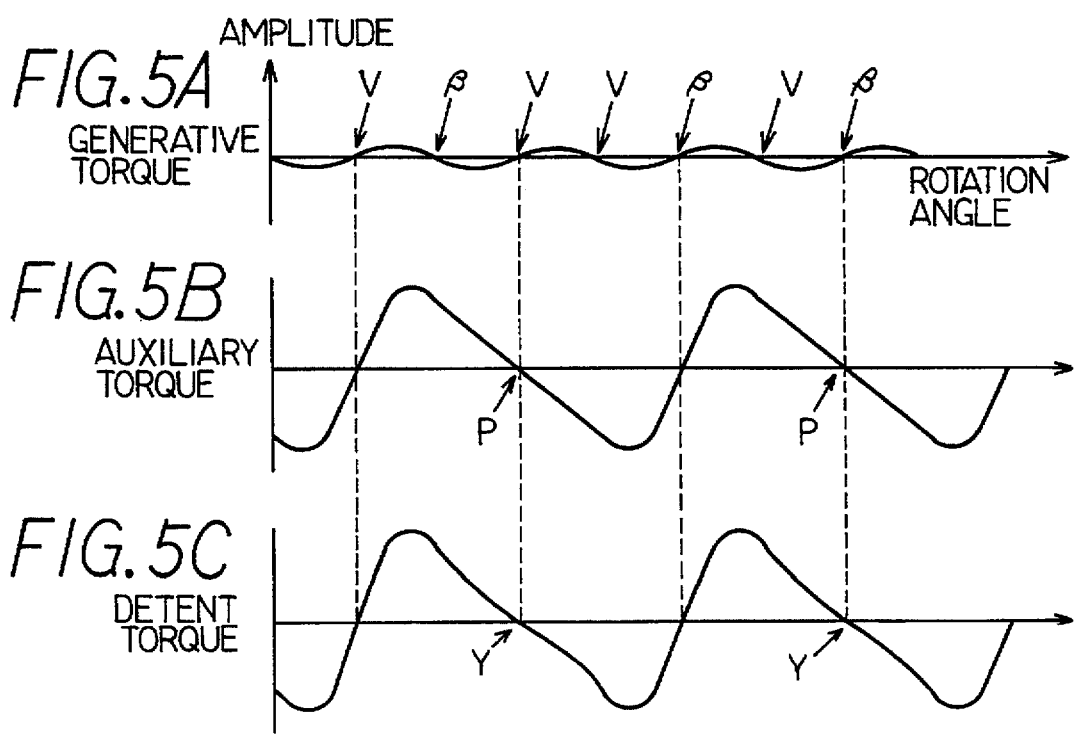
FIG. 5A GENERATIVE TORQUE
FIG. 5B AUXILIARY TORQUE
FIG. 5C DETENT TORQUE FIG. 6
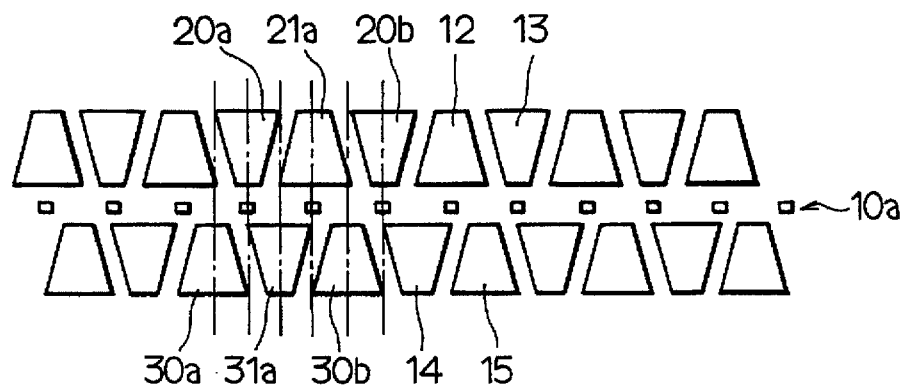
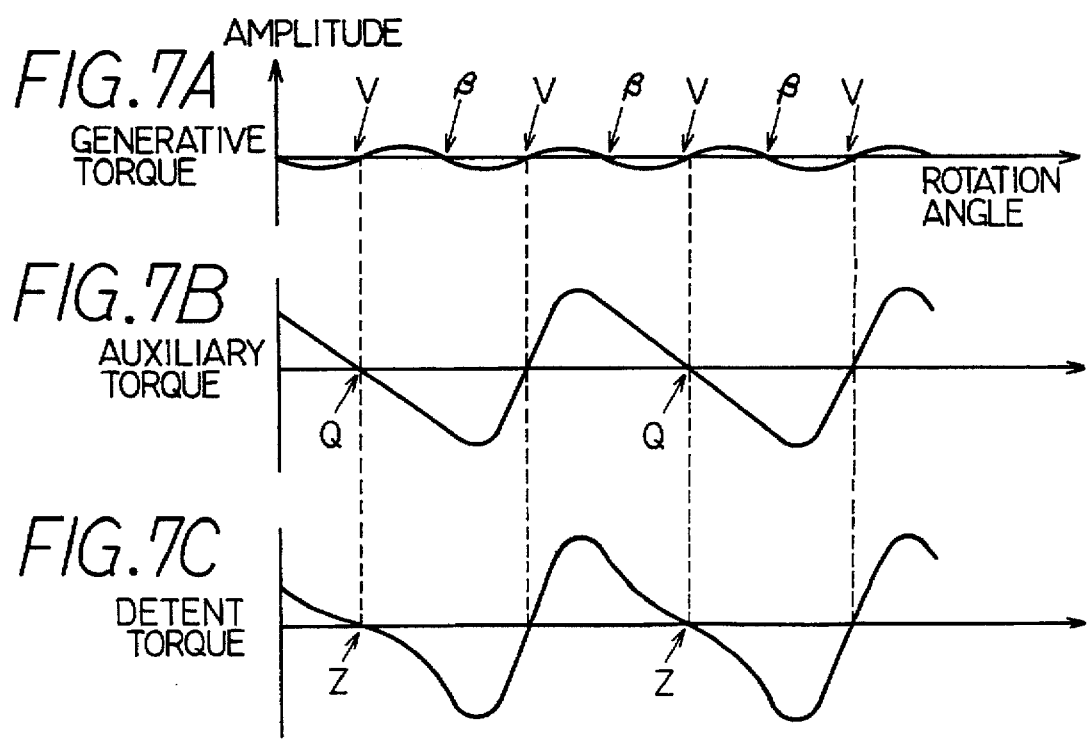

FIG. 8
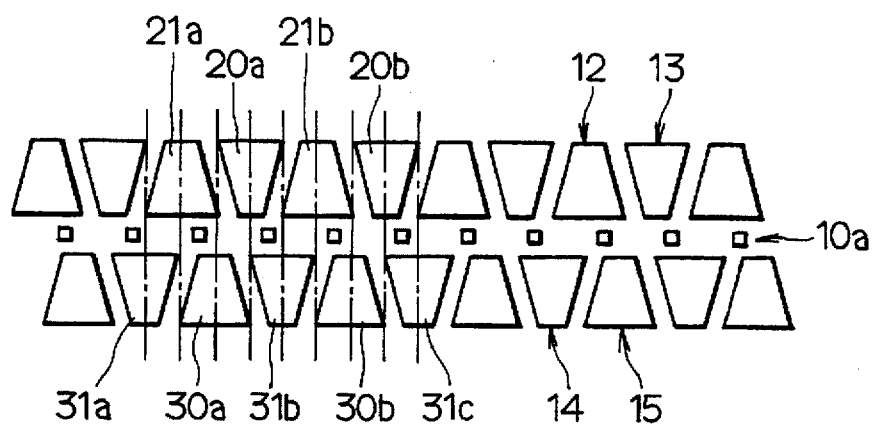
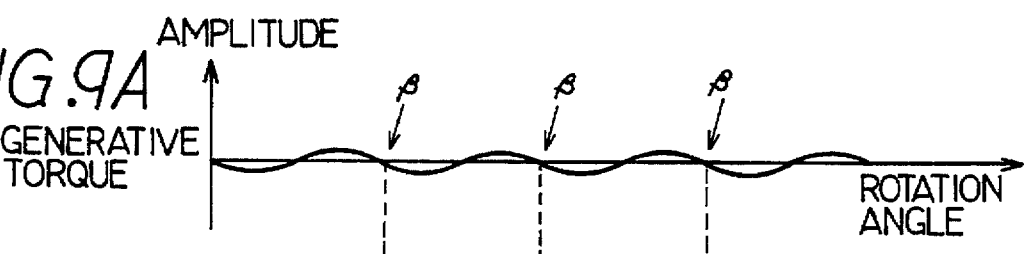
FIG. 9A AMPLITUDE GENERATIVE TORQUE
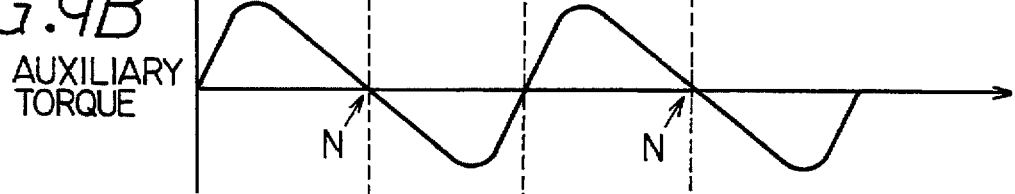
FIG. 9B AUXILIARY TORQUE
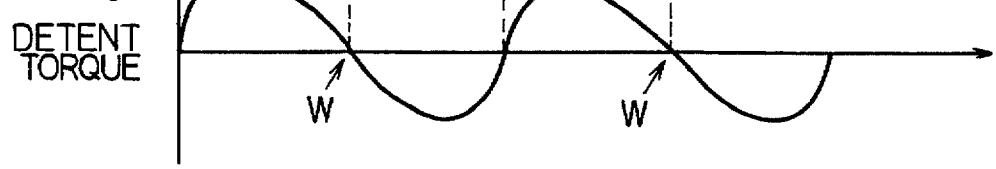
FIG. 9C DETENT TORQUE FIG. 10
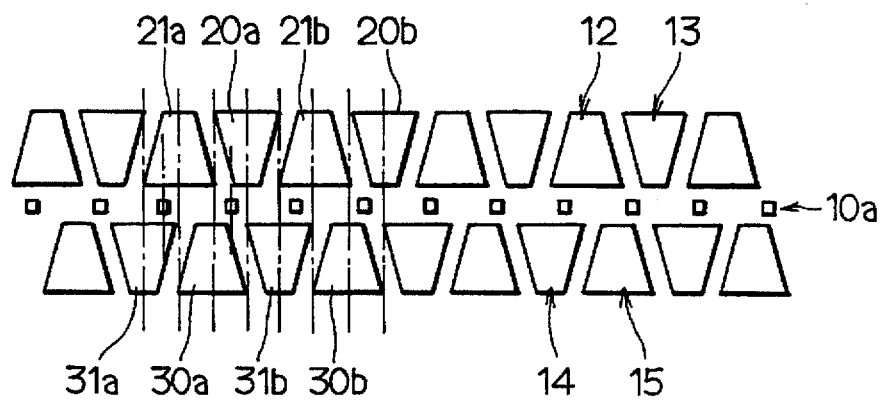
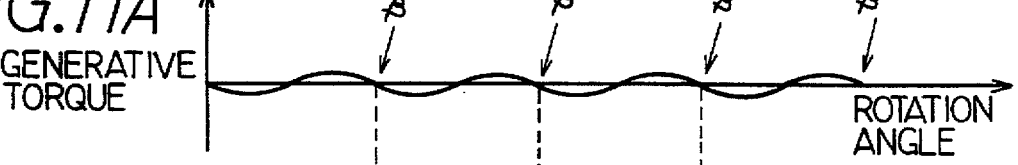
FIG.11A GENERATIVE TORQUE
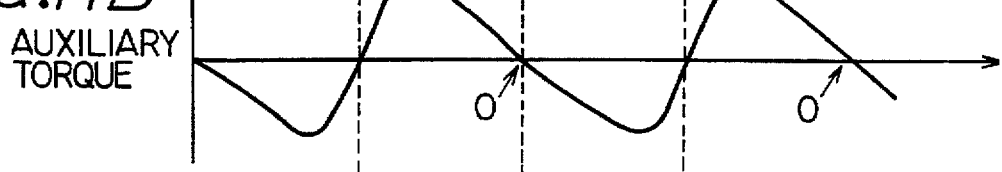
FIG.11B AUXILIARY TORQUE
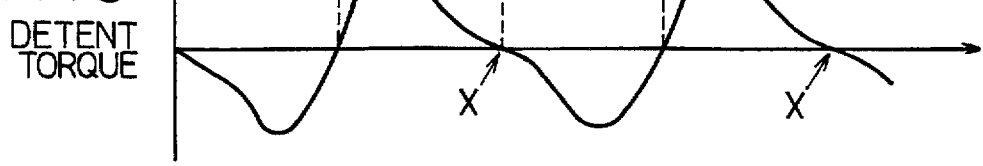
FIG.11C DETENT TORQUE

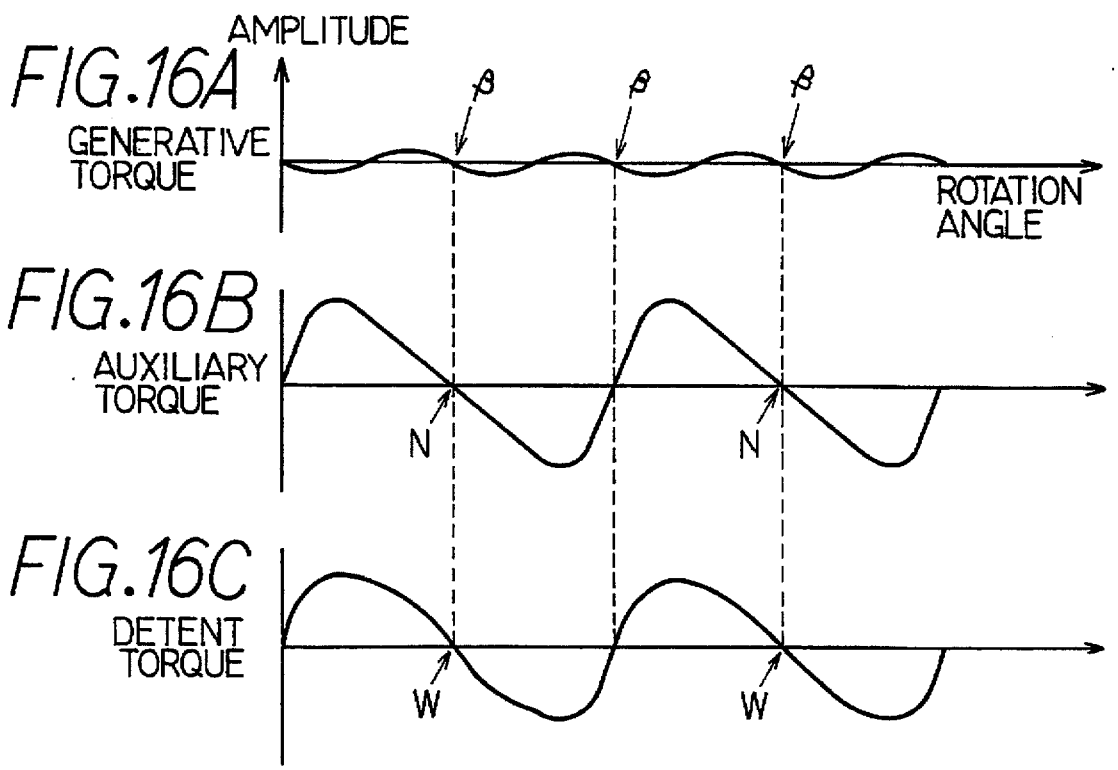
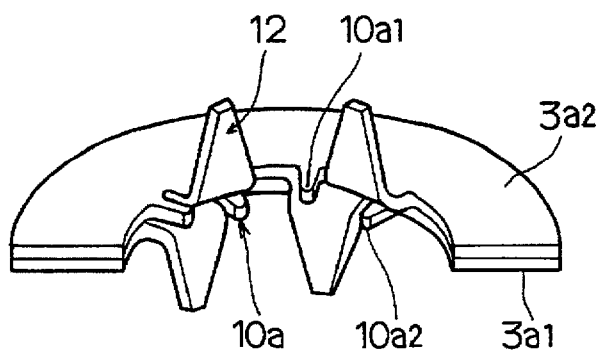

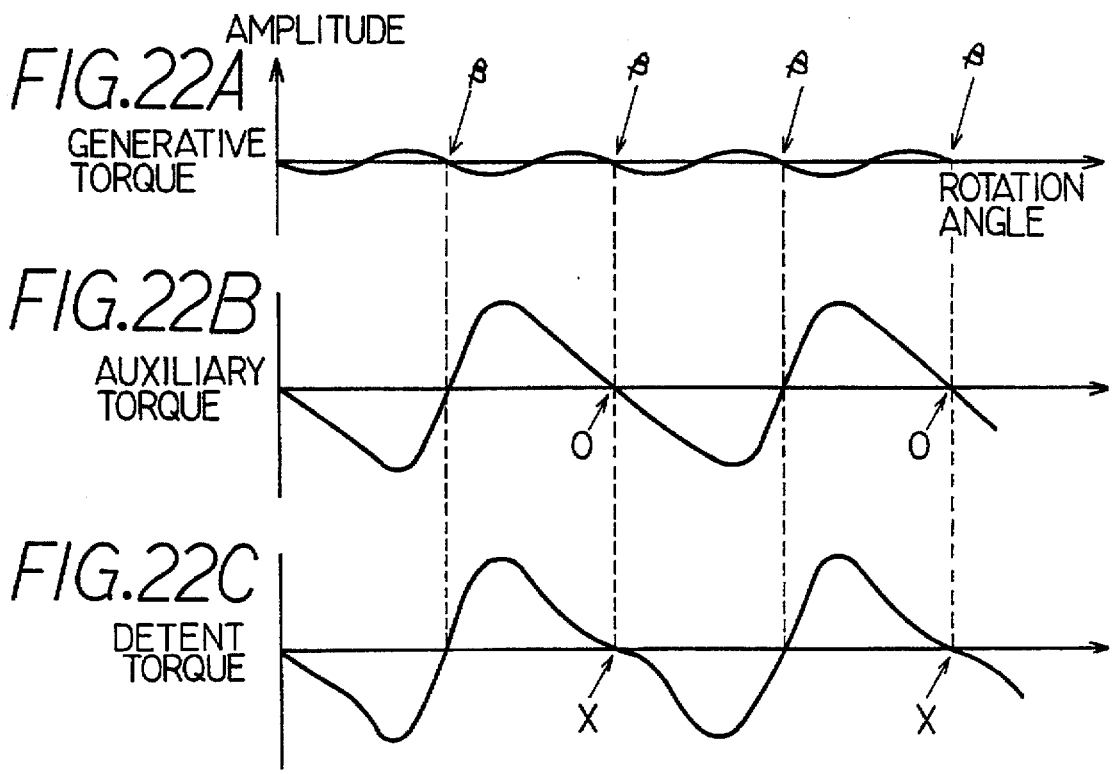
FIG. 22A GENERATIVE TORQUE
FIG. 22B AUXILIARY TORQUE
FIG. 22C DETENT TORQUE
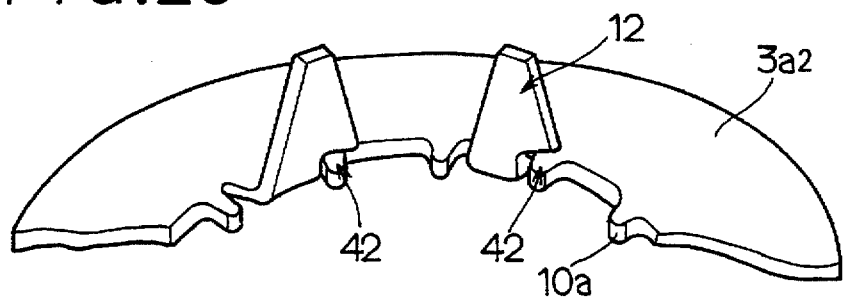
FIG. 23
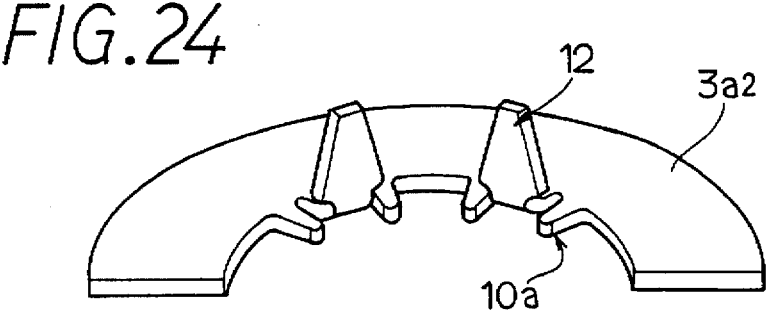
FIG. 24

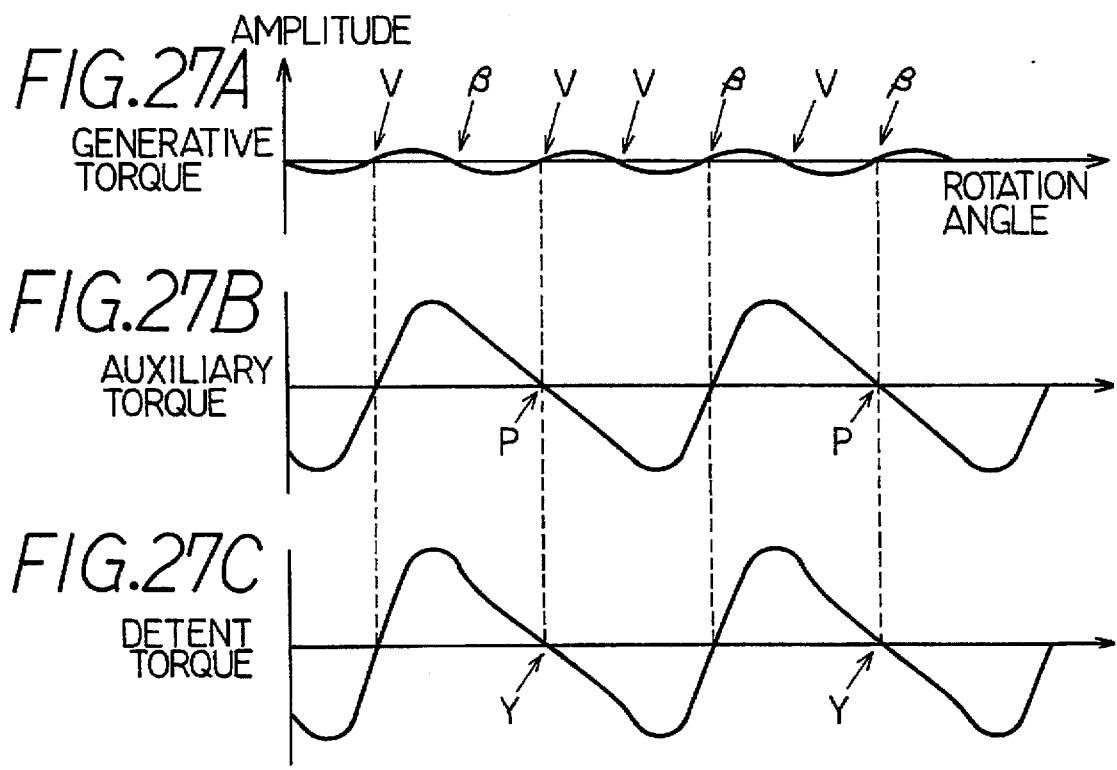
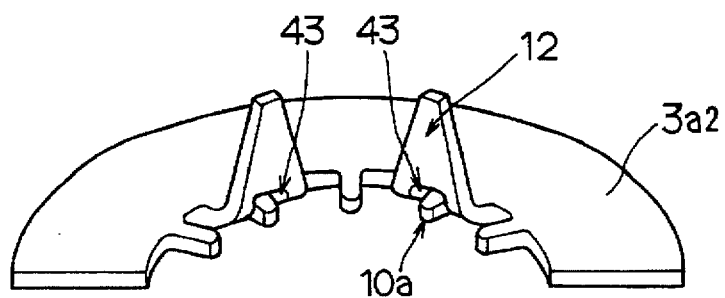

FIG. 29
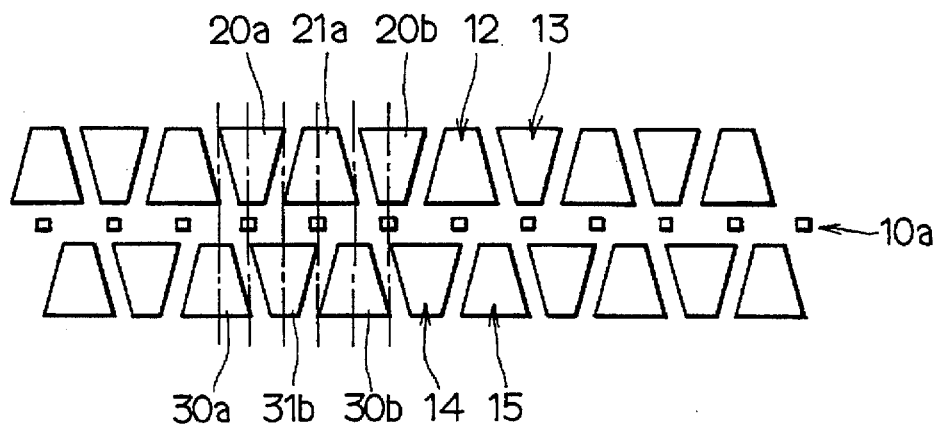
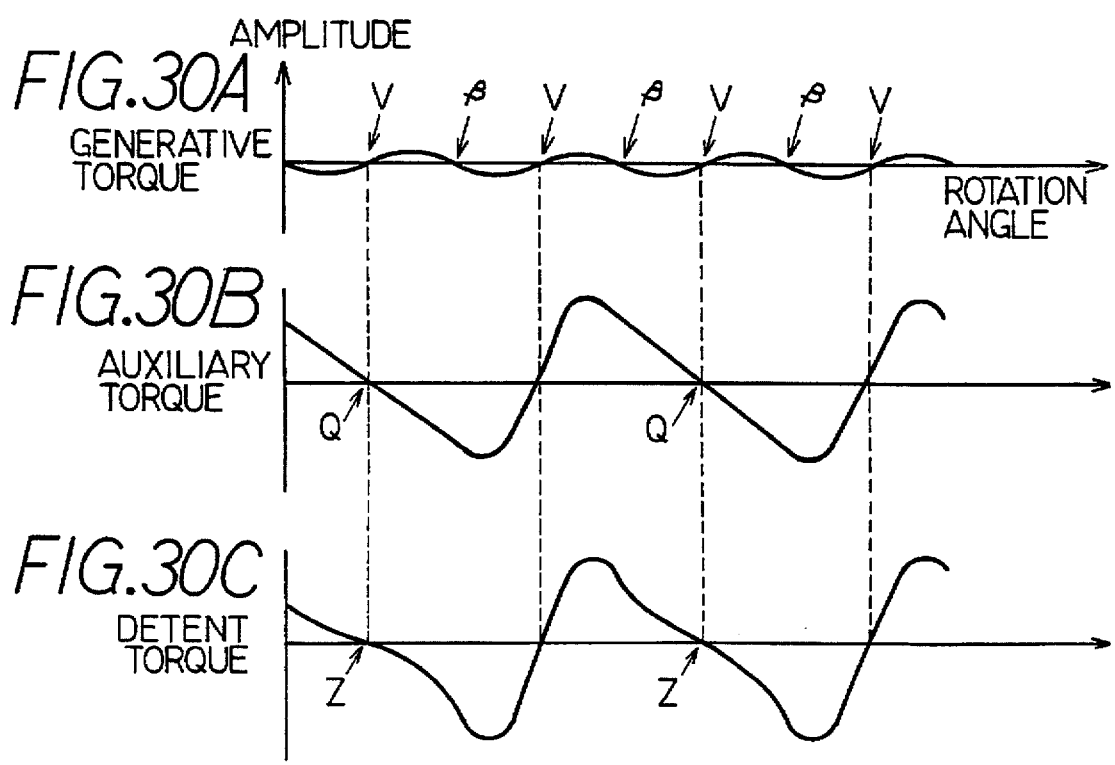

CONTROL ROD

STEPPING MOTOR WITH PROTRUDING POLE TEETH TO INCREASE DETENT TORQUE

CROSS REFERENCE TO RELATED APPLICATION

This application is based upon and claims priority from Japanese Patent Application No. Hei. 6-134240 filed Jun. 6, 1994, No Hei 6-212702 filed Sept. 6, 1994, and No. Hei. 6-238890 filed Oct. 3, 1994, the contents of which are incorporated herein by reference.

BACKGROUND OF THE INVENTION

1. Field of the Invention:

The present invention relates to a stepping motor, particularly to a PM-type stepping motor with a simple constitution making it possible to increase the detent torque for a rotor thereof.

2. Related Art:

In the case of an existing generally-known PM-type stepping motor, a permanent magnet formed on the outer periphery of a rotor effects a magnetic circuit together with a stator core when the stator core is not excited by an exciting coil wound on the stator core. The rotor is moved to a stable position by the magnetic circuit and a detent torque is generated between the rotor and the stator core. When this type of the stepping motor is used for, for example, adjusting an opening degree of a valve for controlling the amount of suction air of an engine or driving a suspension-damping-force adjusting actuator, the detent torque is very important which holds the rotor so that the rotor does not rotate when the stepping motor stops.

Therefore, a stepping motor is recently devised which can increase the detent torque for a rotor or adjust the maximum detent torque responsive to a rotation angle of the rotor. For example, the stepping motor disclosed in the official gazette of Japanese Patent Application Laid Open No. Sho. 60-160363 previously applied by the applicant of the present invention et al. is listed as the above type of stepping motor. This stepping motor is provided with a second stator core which has teeth two times larger than the number of poles of a permanent magnet at positions facing the permanent magnet, which is made of a magnetic material, and which is not influenced by magnetic flux from an exciting coil. The detent torque for a rotor is increased because the generative torque generated by a magnetic circuit effected by the second stator core is synthesized with the generative torque generated by each stator core. As shown in FIG. 37, protrusions 101 two times larger than the number of poles of a permanent magnet at the outer periphery of a rotor 5 are formed on a second stator core 100 and two protruded teeth are arranged by facing each other every N and S poles so as to serve as auxiliary poles for generating the detent torque when the stepping motor is turned off. Detailed description of the constitution is omitted because the constitution is described in the above official gazette in detail.

FIG. 38 shows a model diagram of a magnetic circuit excited by a permanent magnet when a stepping motor having the above second stator core 100 is turned off.

A magnetomotive force generated by the permanent magnet formed on the outer periphery of a rotor 5 works on pole teeth 21 to 24 formed on stator cores 90a1, 90a2, 90b1, and 90b2 and therefore, magnetic circuits A3 and B3 are effected. In this case, the pole tooth 21 is formed on the stator core 90a1, the pole tooth 22 is formed on the stator core 90a2, the pole tooth 23 is formed on the stator core 90b1, and the pole tooth 24 is formed on the stator core 90b2. The electromotive force also works on each protrusion 101 of the second stator core 100 and therefore, magnetic circuits C3 and D3 are effected. These magnetic circuits A3, B3, C3, and D3 generate the detent torque for the rotor.

FIGS. 39A to 39E show a torque generation state of each of the magnetic circuits A3, B3, C3, and D3 when the stepping motor is turned off and FIG. 39F shows the detent torque for the rotor generated by synthesis of each torque. In detail, in FIG. 39F, x axis shows rotation angle of the rotor and y axis shows a generative torque, and the fluctuation of a detent torque in four step angles is shown.

FIG. 39C shows a torque obtained by synthesizing the generative torque A4 generated by the magnetic circuit A3 shown in FIG. 39A and the generative torque B4 generated by the magnetic circuit B3 shown in FIG. 39B. In the case of the synthesized torque, the cycle in which the maximum torque is generated is halved compared to the cases of the torques A4 and B4, and the maximum torque becomes lower than that of the torques A4 and B4. However, it is possible to increase the maximum detent torque shown in FIG. 39F compared to the maximum value of the synthesized torque shown in FIG. 39C by adding the generative torque C4 generated by the magnetic circuit C3 shown in FIG. 39D and the generative torque D4 generated by the magnetic circuit D3 shown in FIG. 39E. Thus, the detent torque for the rotor is increased when the stepping motor is turned off so that a rotor or shaft is not rotated due to vibrations of the stepping motor.

However, to further increase the detent torque for the rotor with the existing constitution when the stepping motor is turned off, it is necessary to use a method for increasing a thickness of the each protrusion formed on the second stator core or a method for enhancing a magnetic force by increasing the physical constitution of the permanent magnet of the rotor. When using these methods, problems occur that the size and the cost of the stepping motor increase. Moreover, increase of the physical constitution of the permanent magnet causes the rotor weight to increase and the performance of the stepping motor to deteriorate.

SUMMARY OF THE INVENTION

Therefore, it is an object of the present invention to provide a stepping motor with a simple constitution making it possible to greatly increase the detent torque when the stepping motor is turned off compared to an existing stepping motor.

To solve the above problems, a stepping motor of the present invention comprises a rotor provided with a cylindrical permanent magnet on whose outer periphery N and S poles are alternately polarized and which is rotatably supported, a plurality of hollow discoid stator cores having pole teeth arranged on the permanent magnet at predetermined intervals so as to be faced each other in an inner circumference thereof, an exciting coil wound on the stator cores to magnetize the pole teeth of the stator cores when it is turned on and thereby rotate the rotor, and at least two protruded teeth serving as auxiliary poles arranged on the cylindrical surface of the permanent magnet to be faced each other so as to generate a detent torque by being magnetized by the permanent magnet when the exciting coil is turned off; in which each of the protruded teeth is arranged so as to face the continuous N and S poles of the permanent magnet.

In the case of the stepping motor of the present invention described above, at least two protruded teeth for generating a detent torque are arranged so that each of the protruded teeth faces one magnetic pole of a permanent magnet. Thereby, at least two protruded teeth are magnetized by the permanent magnet when the stepping motor is turned off and a magnetic circuit is effected. When the magnetic circuit is effected, the torque for holding a rotor is generated. Though the torque for holding a rotor is also generated by pole teeth formed on the stator cores, it is very weak for stepping motors other than a stepping motor using a permanent magnet having a very strong magnetic force. Therefore, as described above, a large detent torque can be obtained by the fact that the torque generated by the protruded teeth is synthesized with the torque generated by the pole teeth.

Moreover, it is possible to use a stepping motor in which the protruded teeth equal to the number of poles of the permanent magnet are formed. In this case, larger detent torque can be generated because the effected number of magnetic circuits increases compared to the case of the stepping motor described above. However, it is necessary form protruded teeth so that each of them corresponds to one magnetic pole of a permanent magnet.

Furthermore, it is possible to use a stepping motor in which the protruded teeth are formed so that the interval between adjacent protruded teeth is almost constant. The detent torque can efficiently be increased because flux densities of magnetic circuits are uniformed by forming protruded teeth at constant intervals.

Furthermore, it is possible to use a stepping motor in which the protruded teeth are formed so that the width of the protruded teeth in the circumferential direction of the permanent magnet is smaller than that of each magnetic pole of the permanent magnet.

Furthermore, it is possible to use a stepping motor in which the protruded teeth are arranged around the center of the cylindrical height of the permanent magnet. In this case, still larger detent torque can be obtained by forming protruded teeth around the center of the cylindrical height of a permanent magnet. This is because a magnetomotive force of the permanent magnet decreases at the both sides of the permanent magnet and protruded teeth cannot strongly be magnetized if the protruded teeth are formed around there.

Furthermore, it is possible to use a stepping motor in which a hollow discoid second stator core made of a magnetic material and arranged in parallel with the plurality of stator cores is included and the protruded teeth are integrated with an inner circumference of the second stator core. Also in this case, it is necessary to form protruded teeth so that one protruded tooth or less corresponds to one magnetic pole of a permanent magnet. Thereby, the protruded teeth are magnetized by the permanent magnet starting with the front ends of them when a stepping motor is turned off. Then, magnetic circuits are effected between the adjacent protruded teeth and the permanent magnet by passing through the second stator core. Thereby, the detent torque can be increased.

Furthermore, it is possible to use a stepping motor in which the protruded teeth are integrated with at least one of the plurality of stator cores. In this case, when all protruded teeth are formed on one stator core, a magnetic circuit is effected which passes through the protruded teeth receiving a magnetomotive force from a permanent magnet and a stator core with the protruded teeth formed on it.

Furthermore, it is possible to use a stepping motor in which the plurality of stator cores are provided with a group of first-line pole teeth formed by two stator cores arranged so that pole teeth directed in opposite directions formed on the two stator cores respectively are engaged each other and a group of second-line pole teeth formed by other two stator cores arranged in the same way with the two stator cores and the second stator core is arranged between a stator core having the group of first-line pole teeth and a stator core having the group of second-line pole teeth.

Furthermore, it is possible to use a stepping motor in which pole teeth in the pole tooth group forming the first line and pole teeth in the pole tooth group forming the second line are arranged so that the positions of them in the circumferential direction on the outer surface of the permanent magnet are deviated from each other by a predetermined distance and the protruded teeth of the second stator core are arranged at mid-position between the closest pole teeth oriented in the same direction in the pole tooth group forming the first line and the pole tooth group forming the second line. When the phase of a pole tooth of each protruded tooth is set as described above in order to set the second stator core having protruded teeth equal to the number of magnetic poles of a permanent magnet, it is possible to efficiently increase the maximum detent torque, for example, when two-phase-exciting a stepping motor. Moreover, it is possible to make a detent position of a stepping motor when the stepping motor is turned on coincide with a detent position of the stepping motor when the stepping motor is turned off.

Furthermore, it is also possible to use a stepping motor in which pole teeth in the pole tooth group forming the first line and pole teeth in the pole tooth group forming the second line are arranged so that the positions of them in the circumferential direction on the outer surface of the permanent magnet are deviated from each other by a predetermined distance and the protruded teeth of the second stator core are arranged at mid-position between the closest pole teeth oriented in the opposite direction in the pole tooth group forming the first line and the pole tooth group forming the second line. Also in this case, when the phase of a pole tooth of each protruded tooth is set as described above in order to set the second stator core having protruded teeth equal to the number of magnetic poles of a permanent magnet, it is possible to efficiently increase the maximum detent torque, for example, when two-phase-exciting a stepping motor. Moreover, it is possible to make a detent position of a stepping motor when the stepping motor is turned on coincide with a detent position of the stepping motor when the stepping motor is turned off.

Furthermore, it is possible to use a stepping motor in which pole teeth in the pole tooth group forming the first line and pole teeth in the pole tooth group forming the second line are arranged so that the positions of them in the circumferential direction on the outer surface of the permanent magnet are deviated from each other by a predetermined distance and the positions of the protruded teeth of the second stator core coincide with the positions of the pole teeth in either of the pole tooth group forming the first line and the pole tooth group forming the second line. By arranging protruded teeth as described above, it is possible to make a detent position when a one-phase-exciting-type stepping motor is turned on forcibly coincide with a detent position when the stepping motor is turned off. That is, though a detent position (angle) of a one-phase-exciting-type stepping motor when the stepping motor is turned on is deviated from a detent position (angle) of the stepping motor due to a torque generated by pole teeth when the stepping motor is turned off, it is possible to not only increase a detent torque but also uniform the step angles when the torque generated by the pole teeth is synthesized with the torque generated by the protruded teeth because the latter torque is slightly larger than the former torque.

Furthermore, it is possible to use a stepping motor in which the plurality of stator cores are provided with a group of first-line pole teeth formed by two stator cores arranged so that pole teeth directed in opposite directions formed on the two stator cores respectively are engaged each other and a group of second-line pole teeth formed by other two stator cores in the same way with the two stator cores and the protruded teeth are integrated with at least one of a stator core arranged at a position close to the pole tooth group forming the second line of the two stator cores provided with the pole tooth group forming the first line and a stator core arranged at a position close to the pole tooth group forming the first line of the two stator cores provided with the pole tooth group forming the second line.

Furthermore, it is possible to use a stepping motor in which the plurality of stator cores are provided with a group of first-line pole teeth formed by two stator cores arranged so that pole teeth directed in opposite directions formed on the two stator cores respectively are engaged each other and a group of second-line pole teeth formed by other two stator cores in the same way with the two stator cores and the protruded teeth are divided and integrated with a stator core arranged at a position close to the pole tooth group forming the second line among the two stator cores provided with the pole tooth group forming the first line and a stator core arranged at a position close to the pole tooth group forming the first line among the two stator cores provided with the pole tooth group forming the second line respectively. In this case, because protruded teeth are divided and formed on two stator cores, it is possible to form a magnetic circuit so as to pass between stator cores contacting each other. As describe above, when protruded teeth are divided and arranged on each stator core, a strong detent torque can efficiently be generated because the protruded teeth are arranged around the center of the cylindrical height of the permanent magnet.

Furthermore, it is possible to use a stepping motor in which pole teeth in the pole tooth group forming the first line and pole teeth in the pole tooth group forming the second line are arranged so that the positions of them in the circumferential direction on the outer surface of the permanent magnet are deviated from each other by a predetermined distance and the protruded teeth are arranged at mid-position between the closest pole teeth oriented in the same direction in the pole tooth group forming the first line and the pole tooth group forming the second line. According to the above construction, also when protruded teeth are integrated with a stator core, it is possible to obtain the same function from a stepping motor to be operated by the two-phase excitation method by arranging the protruded teeth as described above.

Furthermore, it is possible to use a stepping motor in which pole teeth in the pole tooth group forming the first line and pole teeth in the pole tooth group forming the second line are arranged so that the positions of them in the circumferential direction on the outer surface of the permanent magnet are deviated from each other by a predetermined distance and the protruded teeth are arranged on the stator core at mid-position between the closest pole teeth oriented in the opposite direction in the pole tooth group forming the first line and the pole tooth group forming the second line. According to the above construction, also when protruded teeth are integrated with a stator core, it is possible to obtain the same function from a stepping motor to be operated by the two-phase excitation method by arranging the protruded teeth as described above.

Furthermore, it is possible to use a stepping motor in which pole teeth in the pole tooth group forming the first line and pole teeth in the pole tooth group forming the second line are arranged so that the positions of them in the circumferential direction on the outer surface of the permanent magnet are deviated from each other by a predetermined distance and the protruded teeth are formed on the stator cores so that the positions of the protruded teeth coincide with the positions of the pole teeth in either of the pole tooth group forming the first line and the pole tooth group forming the second line. By arranging protruded teeth as described above, it is possible to make a detent position when a one-phase-exciting-type stepping motor is turned on forcibly coincide with a detent position when the stepping motor is turned off. That is, though a detent position (angle) of a one-phase-exciting-type stepping motor when the stepping motor is turned on is deviated from a detent position (angle) of the stepping motor due to a torque generated by pole teeth when the stepping motor is turned off, it is possible to not only increase a detent torque but also uniform the step angles when the torque generated by the pole teeth is synthesized with the torque generated by the protruded teeth because the latter torque is slightly larger than the former torque.

Furthermore, it is possible to use a stepping motor in which the portions of the protruded teeth facing the permanent magnet are formed into curved surfaces. In this case, because the portion of a protruded tooth facing a permanent magnet is formed into a curved surface, it is possible to receive a large magnetomotive force from the permanent magnet and obtain a large maximum detent torque.

Furthermore, it is possible to use a stepping motor in which a detent torque generated by the protruded teeth is adjusted to any value by changing the area of the portion of the protruded tooth facing the permanent magnet. According to the above construction, it is possible to adjust the torque generated by protruded teeth and also adjust the maximum detent torque obtained by synthesizing the above torque in accordance with the specification of a stepping motor.

Furthermore, it is possible to use a stepping motor in which a detent torque generated by the protruded teeth is adjusted to any value by setting the distance between the front end of the protruded teeth and the cylindrical surface of the permanent magnet to a desired value. Also, according to the above construction, it is possible to adjust the torque generated by protruded teeth and also adjust the maximum detent torque obtained by synthesizing the above torque in accordance with the specification of a stepping motor.

Furthermore, it is possible to use a stepping motor in which the pole teeth formed on the plurality of stator cores are pectinate.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

[Brief Description of the Drawings]

Figure 1:
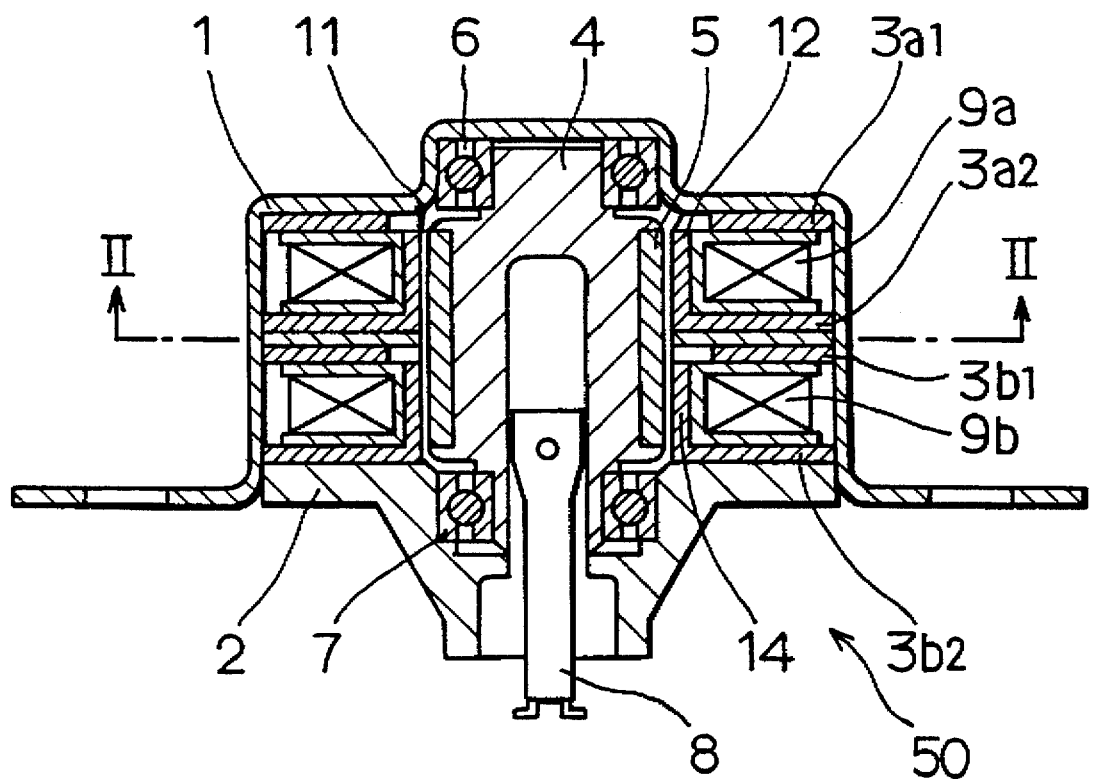
Figure 2:
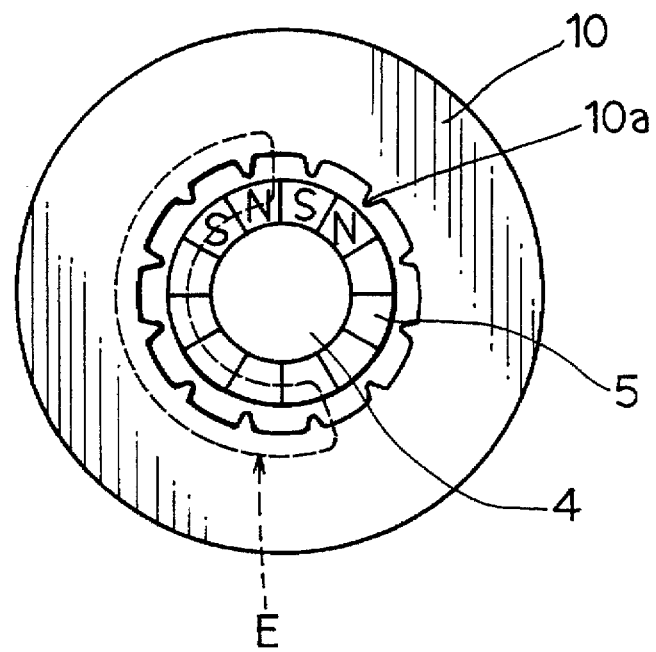
Figure 3:
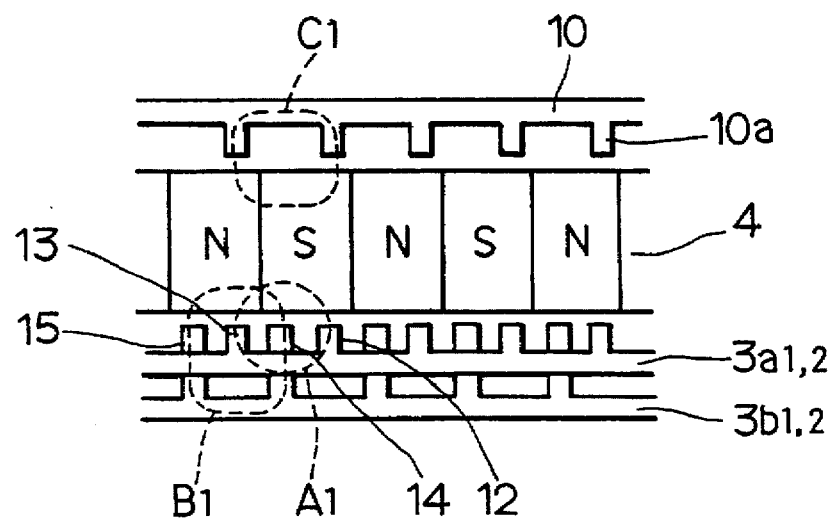
Figure 12:
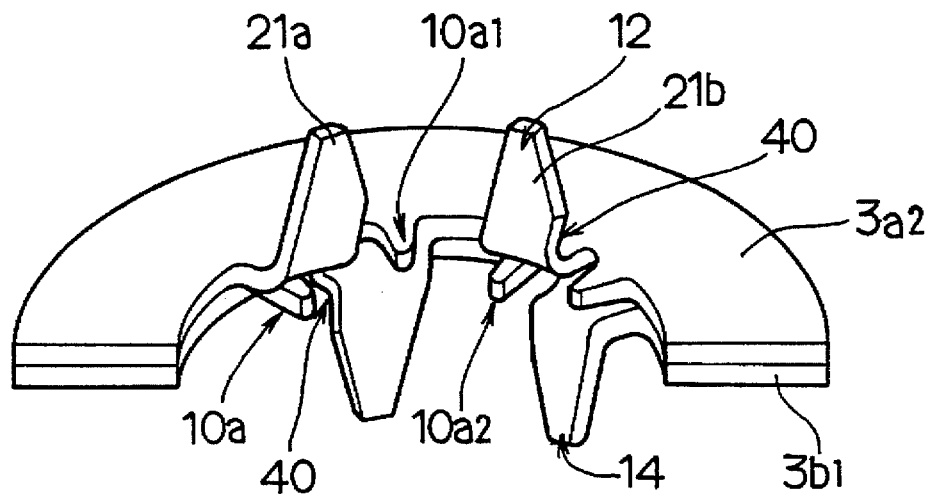
Figure 13:
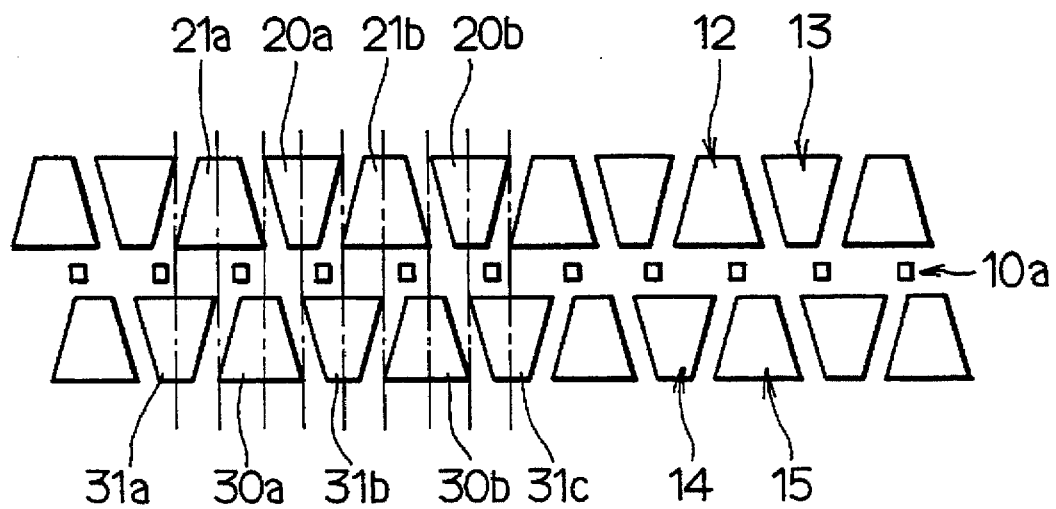
Figure 14:
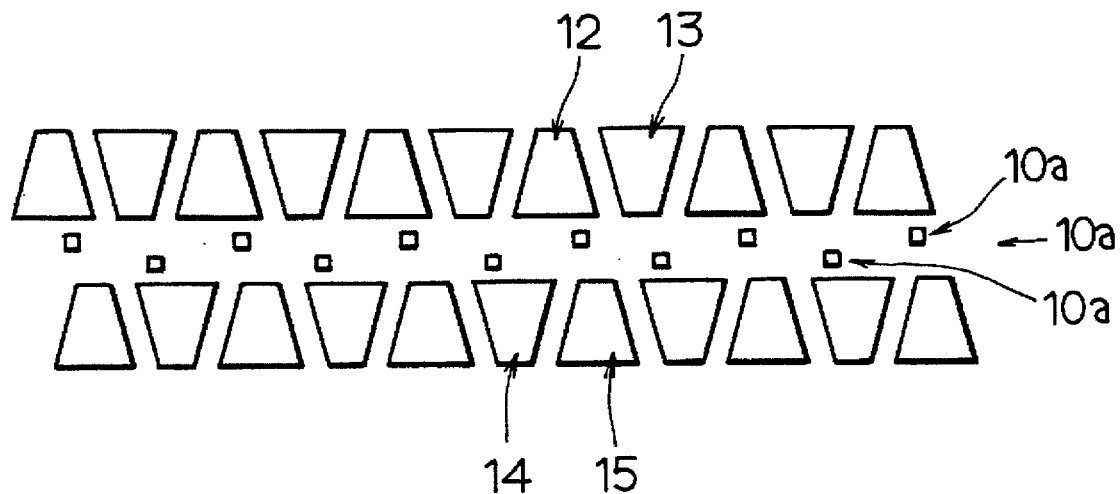
Figure 15:
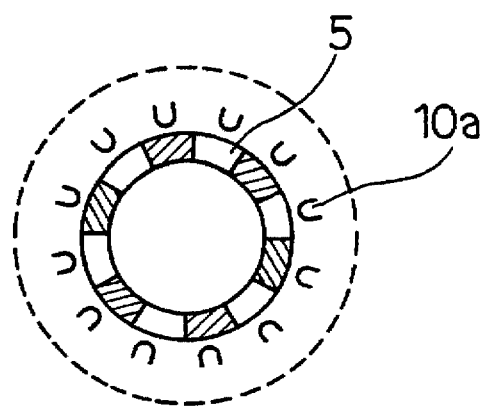
Figure 18:
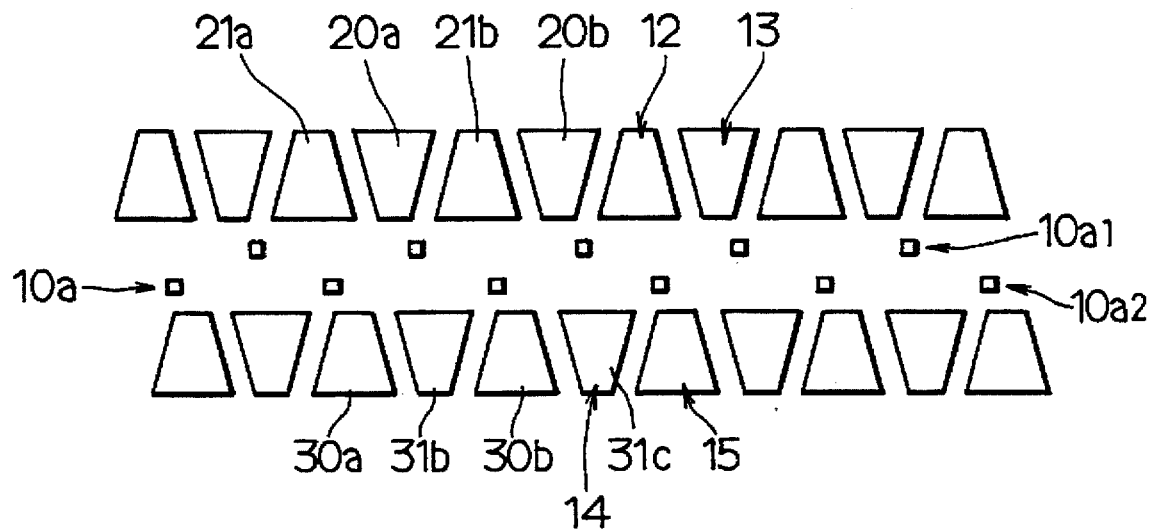
Figure 19:
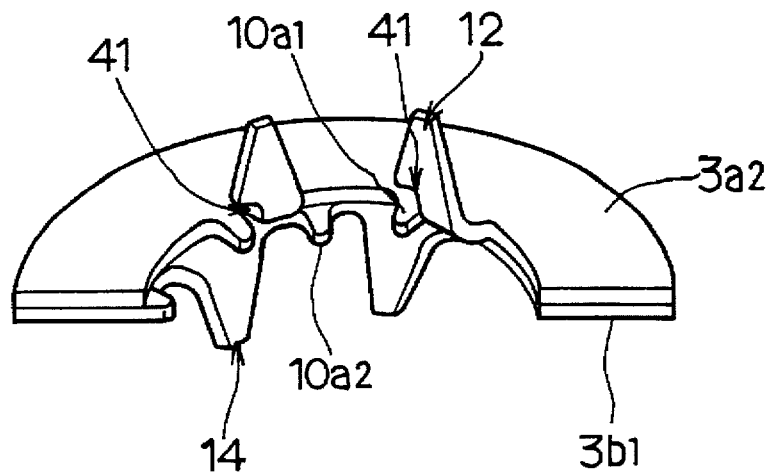
Figure 20:
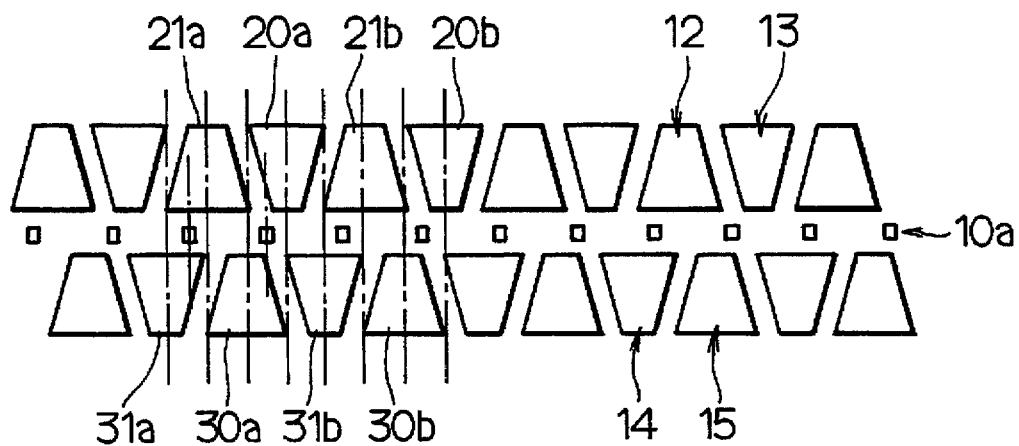
Figure 21:
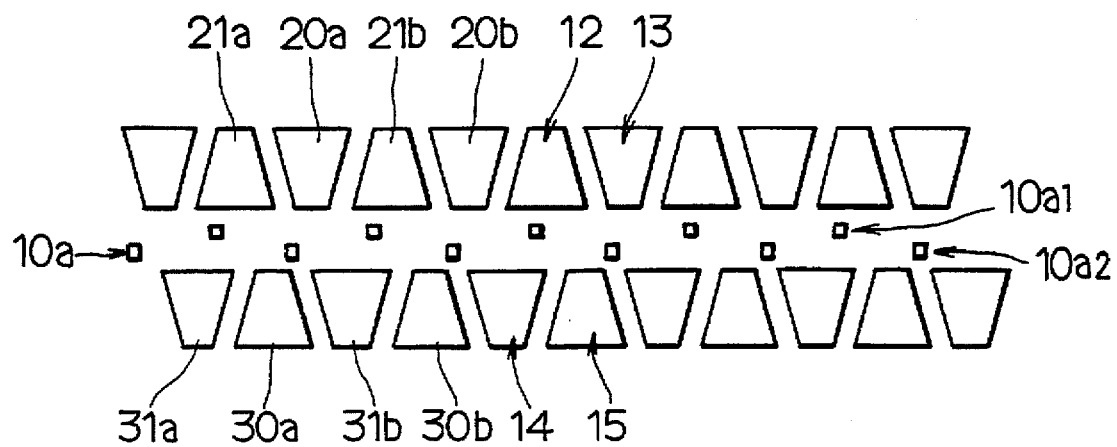
Figure 25:
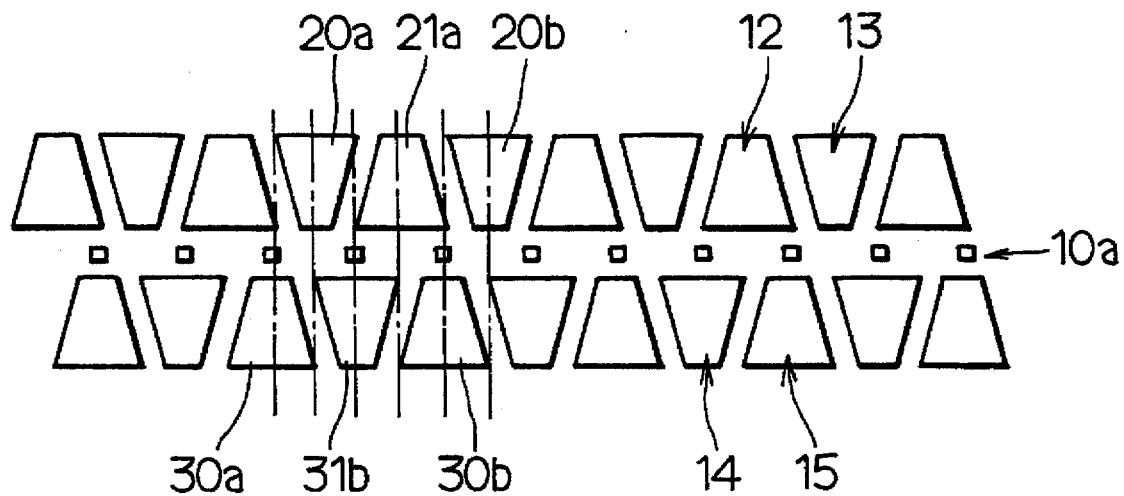
Figure 26:
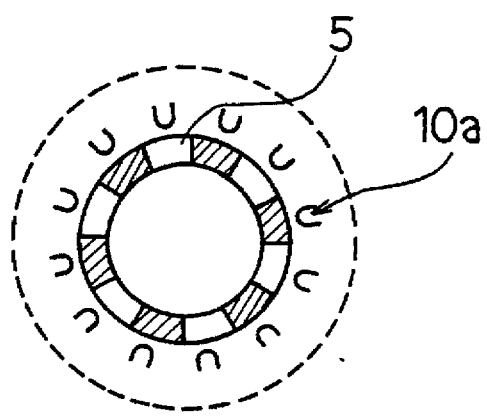
Figure 31:
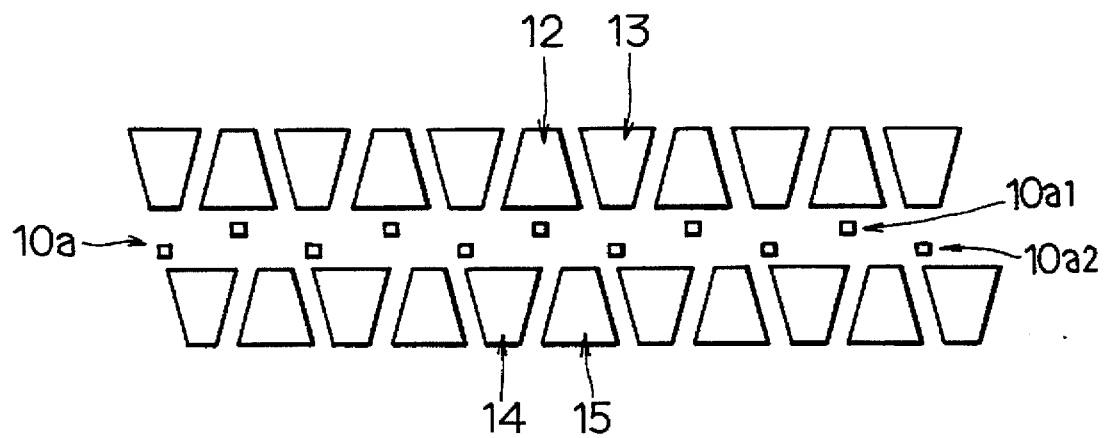
Figure 32:
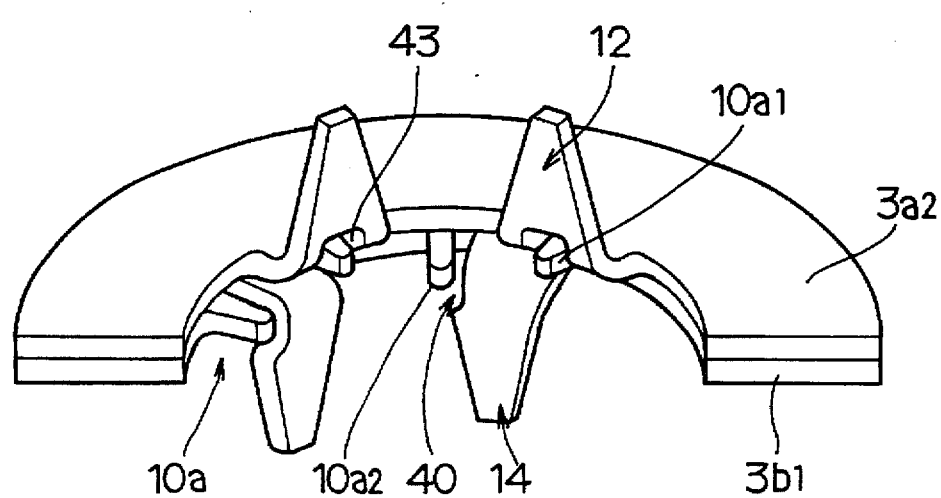
Figure 33:
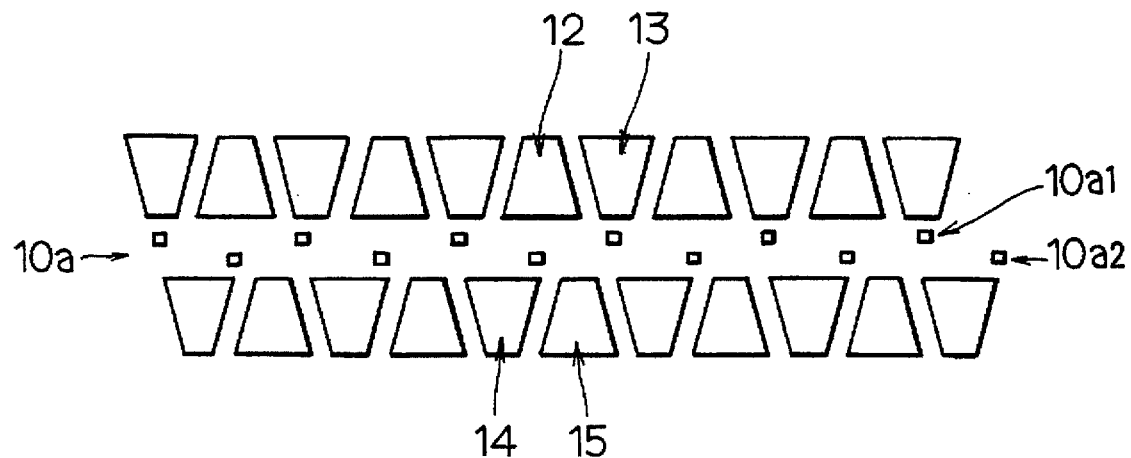
Figure 34:
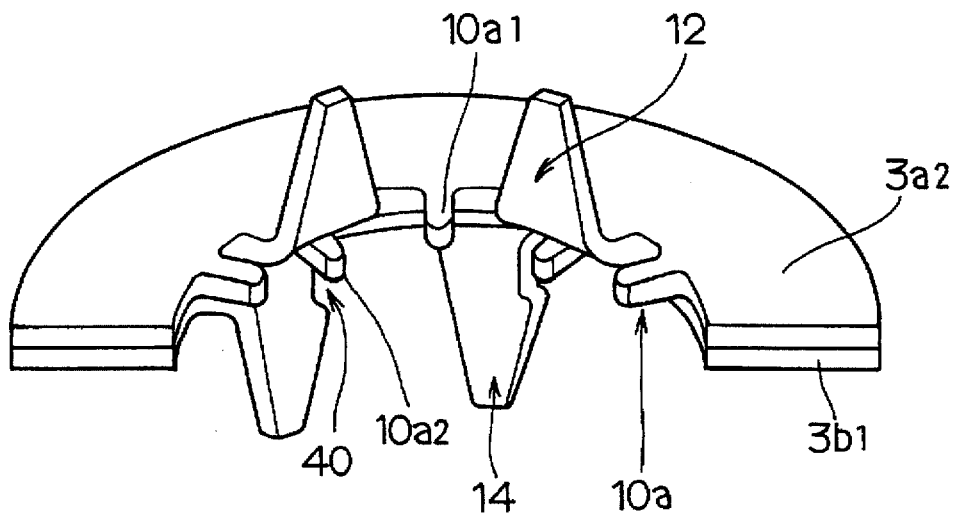
Figure 35:
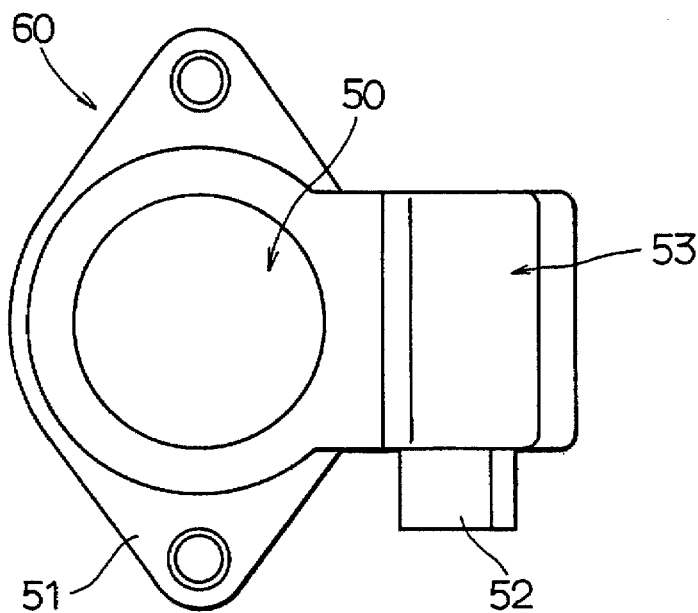
Figure 36:
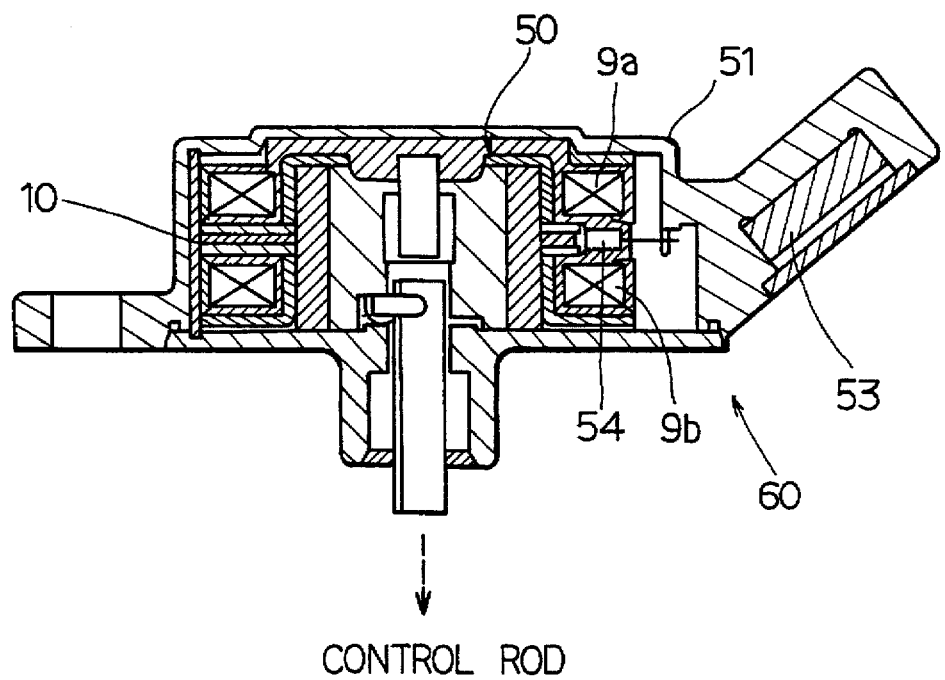
Figure 37:
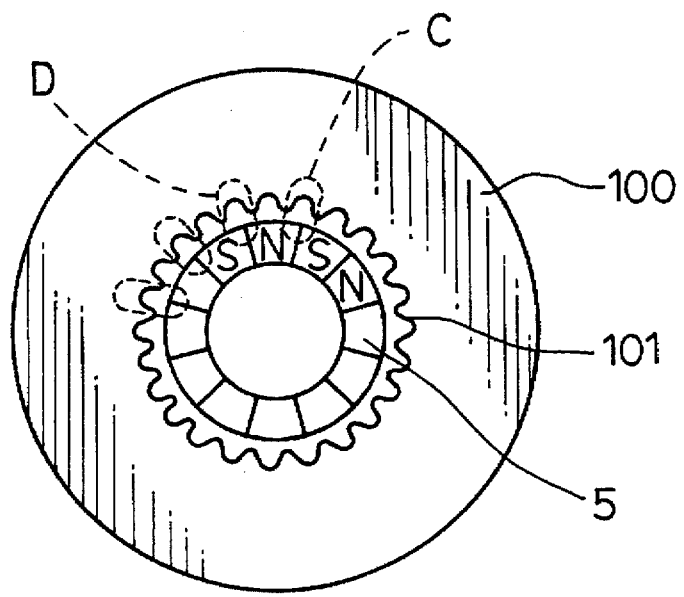
Figure 38:
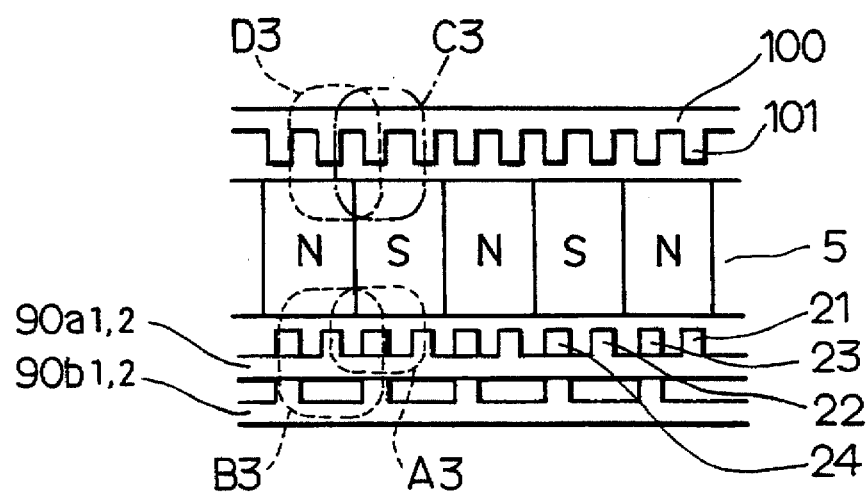

FIG. 1 is a sectional view showing the constitution of a stepping motor of the present invention in which a protruded tooth serving as an auxiliary pole is formed around the center of the cylindrical height of a permanent magnet;

FIG. 2 is an II—II sectional view of FIG. 1;

FIG. 3 is a model diagram showing the positional relation between pole teeth forming first and second lines and protruded teeth formed on each stator core in the first embodiment;

FIG. 4 is a model diagram showing the positional relation between protruded teeth distributed to two stator cores and pole teeth in the first embodiment;

FIGS. 5A to 5C are characteristic diagrams showing how each torque and a detent torque are generated in a stepping motor in the first embodiment;

FIG. 6 is a model diagram showing the positional relation between protruded teeth and pole teeth in a stepping motor showing a modification of the first embodiment;

FIGS. 7A to 7C are characteristic diagrams showing how each torque and a detent torque are generated in the stepping motor in FIG. 6;

FIG. 8 is a model diagram showing the positional relation between pole teeth forming first and second lines and protruded teeth formed on each stator core in the second embodiment;

FIGS. 9A to 9C are characteristic diagrams showing how each torque and a detent torque are generated in a stepping motor in the second embodiment;

FIG. 10 is a model diagram showing the positional relation between protruded teeth and pole teeth in a stepping motor showing a modification of the second embodiment;

FIGS. 11A to 11C are characteristic diagrams showing how each torque and a detent torque are generated in the stepping motor shown in FIG. 10;

FIG. 12 is a perspective diagram showing the constitution of each stator core on which a protruded tooth serving as an auxiliary pole is formed between pole teeth in the third embodiment;

FIG. 13 is a model diagram showing the positional relation between pole teeth forming first and second lines and protruded teeth formed on each stator core in the third embodiment;

FIG. 14 is a model diagram showing the positional relation between protruded teeth distributed to two stator cores and pole teeth in the third embodiment;

FIG. 15 is an illustration showing the positional relation between each protruded tooth and each magnetic pole of a permanent magnet formed on a rotor which are faced each other in the third embodiment;

FIGS. 16A to 16C are characteristic diagrams showing how each torque and a detent torque are generated in the stepping motor in the third embodiment;

FIG. 17 is a perspective diagram showing the constitution of each stator core on which a protruded tooth serving as an auxiliary pole is formed between pole teeth in the fourth embodiment;

FIG. 18 is a model diagram showing the positional relation between pole teeth forming first and second lines and protruded teeth formed on each stator core in the fourth embodiment;

FIG. 19 is a perspective diagram showing the constitution of each stator core on which a protruded tooth serving as an auxiliary pole is formed between pole teeth in the fifth embodiment;

FIG. 20 is a model diagram showing the positional relation between pole teeth forming first and second lines and protruded teeth formed on each stator core in the fifth embodiment;

FIG. 21 is a model diagram showing the positional relation between protruded teeth distributed to two stator cores and pole teeth in the fifth embodiment;

FIGS. 22A to 22C are characteristic diagrams showing how each torque and a detent torque are generated in the stepping motor in the fifth embodiment;

FIG. 23 is a perspective diagram of a stator core in the sixth embodiment;

FIG. 24 is a perspective diagram showing the constitution of a stator core on which a protruded tooth serving as an auxiliary pole is formed between pole teeth in the seventh embodiment;

FIG. 25 is a model diagram showing the positional relation between pole teeth forming first and second lines and protruded teeth formed on each stator core in the seventh embodiment;

FIG. 26 is an illustration showing the positional relation between each protruded tooth and each magnetic pole of a permanent magnet formed on a rotor which are faced each other in the seventh embodiment;

FIGS. 27A to 27C are characteristic diagrams showing how each torque and a detent torque are generated in the stepping motor in the seventh embodiment;

FIG. 28 is a perspective diagram showing the constitution of a stator core on which a protruded tooth serving as an auxiliary pole is formed between pole teeth in the eighth embodiment;

FIG. 29 is a model diagram showing the positional relation between pole teeth forming first and second lines and protruded teeth formed on each stator core in the eighth embodiment;

FIGS. 30A to 30C are characteristic diagrams showing how each torque and a detent torque are generated in the stepping motor in the eighth embodiment;

FIG. 31 is a model diagram showing the positional relation between protruded teeth distributed to two stator cores and pole teeth in the ninth embodiment;

FIG. 32 is a perspective diagram showing the constitution of each stator core on which a protruded tooth serving as an auxiliary pole is formed in the ninth embodiment;

FIG. 33 is a model diagram showing the positional relation between protruded teeth distributed to two stator cores and pole teeth in the tenth embodiment;

FIG. 34 is a perspective diagram showing the constitution of each stator core on which a protruded tooth serving as an auxiliary pole is formed in the tenth embodiment;

FIG. 35 is a front view of an actuator employing a stepping motor of the present invention;

FIG. 36 is a sectional view of the actuator in FIG. 35;

FIG. 37 is an illustration showing the relation between a protruded tooth and a permanent magnet of an existing stepping motor;

FIG. 38 is a model diagram showing the relation between pole teeth and protruded teeth forming first and second lines and a magnetic circuit forming state in the existing stepping motor; and FIGS. 39A to 39F are characteristic diagrams showing how each torque and a detent torque are generated in the existing stepping motor.

DETAILED DESCRIPTION OF THE PREFERRED EMBODIMENTS

Stepping motors of the present invention are described below by referring to the accompanying drawings.

The first embodiment of the present invention is described below by referring to FIGS. 1 to 5.

FIG. 1 is a view showing the constitution of a stepping motor of the present invention, which is a sectional view showing the constitution in which protruded teeth which are a feature of the present invention are arranged on a second stator core so as to be faced with a permanent magnet. FIG. 2 is an II—II sectional view of FIG. 1.

First, the constitution of a stepping motor 50 is described below by referring to FIG. 1. A first housing 1 made of a magnetic material and formed like a cup and a second housing 2 made of a non-magnetic material and formed like a disk are mutually secured by not-illustrated screws to form a frame. Bearings 6 and 7 are secured in the frame and a rotor 4 is rotatably supported by the bearings 6 and 7. The rotor 4 is provided with a permanent magnet 5 on its outer periphery. Moreover, a shaft 8 with the same central axis as the rotor 4 is secured to the rotor 4. Stator cores 3a1, 3a2, 3b1, and 3b2 serving as stator poles are secured to the inner surface of the first housing 1 facing the rotor 4 at a space 11 therebetween. Pole teeth 12 to 15 are formed on the inner peripheries of the stator cores 3a1, 3a2, 3b1, and 3b2 facing the rotor 4 as described later by referring to FIG. 3. Exciting coils 9a and 9b for exciting the stator cores 3a1, 3a2, 3b1, and 3b2 insulated by a not-illustrated insulating material from each other are wound inside the stator cores 3a1, 3a2, 3b1, and 3b2. A second stator core 10 made of a magnetic material is disposed between the stator cores 3a1, 3a2, 3b1, and 3b2. The second stator core 10 may be disposed in parallel with the stator cores 3a1, 3a2, 3b1, and 3b2 so as to face the permanent magnet 5. For example, it is possible to dispose the second stator core 10 so as to contact either of the stator cores 3a1 and 3b2.

As shown in FIG. 2, protruded teeth 10a equal to the number of magnetic poles on the permanent magnet 5 are formed on the inner circumference of the hollow discoid second stator core 10 facing the permanent magnet 5 at equal intervals. That is, the number of protruded teeth 10a is equal to half the number of protruded teeth of the second stator core of the stepping motor described by referring to FIGS. 37 to 39 in the "Related Art". The faces of the protruded teeth 10a facing the permanent magnet are formed into curved surfaces which are advantageous to generate a large detent torque in view of the following point. That is, because magnetic flux of the permanent magnet 5 normally vertically enters the faces of the protruded teeth 10a facing the permanent magnet 5, influence of the magnetic flux can be received from wide area on the cylindrical surface of the permanent magnet 5 by forming the faces of the protruded teeth 10a facing the permanent magnet 5 into curved surfaces. In FIG. 2, one protruded tooth 10a is set for N and S poles one each at equal intervals on the inner circumference of the second stator core 10. However, it is also possible to arrange only the protruded teeth 10a formed on the portion E and disuse other protruded teeth. That is, it is possible to increase the detent torque of the stepping motor 50 by arranging at least two protruded teeth so as to face the consecutive N and S poles of the permanent magnet 5. Therefore, it is possible to arrange two consecutive protruded teeth 10a on each pole of the permanent magnet 5 and also two consecutive protruded teeth 10a on each pole of the permanent magnet 5 at the opposite side to the center of the disk of the second stator core 10.

FIG. 4 is a model diagram showing the positional relation between pole teeth 12, 13, 14, and 15 formed on the stator cores 3a1, 3a2, 3b1, and 3b2 on one hand and the protruded teeth 10a on the other. The positional relation shown in FIG. 4 is set so as to make a step angle of the shaft 8 (rotor 4) when the stepping motor 50 is turned on coincide with a step angle of the shaft 8 when the motor 50 is turned off in operating the stepping motor 50 by the one-phase excitation method. The step angle when the stepping motor 50 is turned on is defined as a predetermined angle making it possible to control a rotation angle of the shaft 8.

As shown in FIG. 4, a first line is formed by the pole teeth 12 and 13 formed on the stator cores 3a1 and 3a2 and a second line is formed by the pole teeth 14 and 15 formed on the stator cores 3b1 and 3b2. In the case of a stepping motor, the pole teeth 12 and 13 forming the first line and the pole teeth 14 and 15 forming the second line normally have a predetermined positional difference (mutual deviation). As for an embodiment of the present, the positional difference is set as described below. That is, on the basis of the pole teeth 12 and 13 forming the first line, the pole teeth 14 and 15 forming the second line are arranged at a position deviated by ¼ the positional difference between pole teeth 20a and 20b in the first line, in other words, a position deviated by ½ the positional difference between pole teeth 20a and 21a. Therefore, when viewed from the pole tooth 21a in the first line, pole teeth 30a and 31a in the second line are set to a position deviated by ¼ the positional difference between the pole teeth 20a and 20b, in other words, ½ the positional difference between the pole teeth 20a and 21a.

As shown in FIG. 4, the protruded teeth 10a formed on the second stator core 10 are arranged at the same position as the pole teeth 14 and 15 forming the second line at equal intervals.

Functions and advantages of the stepping motor of the first embodiment with the above constitution are described below.

When the stepping motor 50 is turned off, the stator cores 3a1, 3a2, 3b1, and 3b2 are mere magnetic materials. However, a magnetic circuit is effected in the stator cores 3a1, 3a2, 3b1, and 3b2 by a magnetomotive force of the permanent magnet of the rotor 2. To effect the magnetic circuit, a multiple-pattern effecting method is considered. Moreover, a magnetic circuit is effected in the second stator core 10 through the protruded teeth 10a. An example of the magnetic circuit is described below by referring to the model diagram in FIG. 3.

First, a magnetic circuit A1 through the pole teeth 12 and 13 forming the first line is effected through the stator cores 3a1 and 3a2 and the housing 1 formed by a magnetic material. Moreover, a magnetic circuit B1 through the pole teeth 14 and 15 forming the second line is effected through the stator cores 3b1 and 3b2 and the housing 1 formed by a magnetic material. Furthermore, a magnetic circuit C1 is effected in the second stator core 10 through the protruded teeth 10a. In this case, though understood from FIG. 5 to be described later, an inexpensive stepping motor does not normally use the permanent magnet 5 having a strong magnetic force but it uses a ferrite magnet or the like. Therefore, the torque obtained by synthesizing the torque generated by the magnetic circuits A1 and B1 effected by the pole teeth 12, 13, 14, and 15 is very small, while the torque generated by the magnetic circuit C1 effected by the protruded teeth 10a is much larger. Thus, by effecting at least one magnetic circuit C1, it is possible to increase the detent torque of the stepping motor 50. That is, as previously described about FIG. 2, by arranging at least two consecutive protruded teeth 10a on each magnetic pole of the permanent magnet 5, the magnetic circuit C1 is effected and the detent torque can be increased. To effect a magnetic circuit, not only the above pattern but also various patterns are considered. For example, a magnetic circuit may be effected between first and second lines through each pole tooth. The rotor 2 rotates so that the magnetic circuit thus effected becomes stable and a detent torque is generated between the rotor 4 and the stator cores 3a1, 3a2, 3b1 and 3b2. In this case, the detent torque is effected by the fact that the auxiliary torque generated by the protruded teeth 10a are synthesized with the generative torque generated by the pole teeth 12 to 15 and the like as described later about FIG. 5.

The generative torque generated by the pole teeth 12 to 15, the auxiliary torque generated by the protruded teeth 10a, and the detent torque obtained by synthesizing these torques when the stepping motor 50 is turned off are described below by referring to FIG. 5.

As described above, the generative torque generated by the pole teeth 12, 13, 14, and 15 formed on the stator cores 3a1, 3a2, 3b1, and 3b2 is shown in FIG. 5A, which is smaller than the auxiliary torque generated by the protruded teeth 10a to be described later. The generative torque is generated by the fact that the pole teeth 12 to 15 are magnetized by the permanent magnet 5 of a rotor 4 when power is not supplied to the exciting coil 9a or 9b and the stepping motor 50 is turned off. Moreover, the generative torque is obtained by synthesizing the torque generated by the magnetic circuit A1 and the torque generated by the magnetic circuit B1 described in FIG. 3. When the stepping motor 50 is turned off, the rotor 4 or the shaft 8 stops at the rotation angle β by the generative torque. However, the rotation angle β corresponds to a power-supply detent position when the stepping motor 50 is operated by means of two-phase excitation. Therefore, the detent position of the stepping motor 50 when it is turned off is forcibly set to a detent position V when the stepping motor 50 is operated by means of one-phase excitation by the auxiliary torque generated by the protruded teeth 10a. That is, the detent position of the stepping motor 50 when it is turned off is made to coincide with the detent position of the rotor 4 by adjusting the detent position to a stable position when the exciting coils 9a and 9b are turned on.

To realize the above mentioned, a torque slightly larger than the generative torque is generated by the protruded teeth 10a so that a step angle due to the torque becomes equal to the rotation angle V. To realize this, the protruded teeth 10a set as described above generates an auxiliary torque for the step angle of the shaft 8 to come to P as shown in FIG. 5B. The cycle of the auxiliary torque generated by the protruded teeth 10a is two times larger than that of the auxiliary torque generated by the protruded teeth in the case where the above-described stepping motor according to the prior art has protruded teeth two times as many as the number of poles of the permanent magnet, and thereby the generative frequency of the step angle is halved. However, the magnitude of the auxiliary torque is much larger than the auxiliary torque (obtained by synthesizing the torques generated by the magnetic circuits C3 and D3 in FIG. 39) generated by protruded teeth of the existing stepping motor. It is needless to say that the fact that the number of protruded teeth 10a is decreased compared to the existing number of protruded teeth is very advantageous in punching the second stator core 10 by a press merely in view of manufacture of the second stator core 10.

A torque obtained by synthesizing the generative torque and auxiliary torque serves as the detent torque shown in FIG. 5C. The maximum value of the detent torque is increased by a value equivalent to the auxiliary torque generated by the protruded teeth 10a by synthesizing a large auxiliary torque with the above generative torque and results in a value capable of completely holding the shaft 8 when power is turned off. In this case, the detent position with regard to the stator cores 3a1, 3a2, 3b1, and 3b2 for the detent torque, that is, the step angle of the stepping motor 50 becomes equal to a rotation angle Y because the auxiliary torque is slightly larger than the generative torque. In this case, though the rotation angle Y equals the step angle V in FIG. 5A, the occurrence frequency of the rotation angle Y is half the occurrence frequency of the step angle V. Therefore, when the generative cycle of the maximum detent torque is lengthened, the detent position of the shaft 8 becomes rough and therefore it may not be possible to stop the shaft 8 at an optional step angle when the stepping motor 50 is turned off. Moreover, even when the stepping motor 50 is turned on, it may not be possible to perform fine control by the stepping motor 50. However, it is possible to solve the above problems by increasing the number of magnetic poles of the permanent magnet 5, the number of pole teeth 12 to 15 of the stator cores 3a1, 3a2, 3b1, and 3b2, and the number of protruded teeth 10a of the second stator core 10, thereby decreasing one step angle, and thereby increasing the occurrence frequency of the step angle of the rotor 4.

Thus, according to the first embodiment of the present invention, it is possible to provide the stepping motor 50 capable of increasing the maximum detent torque with a simple constitution.

Moreover, as shown in FIG. 6, it is possible to arrange the protruded teeth 10a formed on the second stator core 10 at the same position as the pole teeth 12 and 13 forming the first line when the second stator core 10 is installed in the stepping motor 50.

FIG. 7B shows the auxiliary torque generated by the protruded teeth 10a set as shown in FIG. 6, in which the step angle of the shaft 8 due to the auxiliary torque is Q. Moreover, in this case, because the arrangement position of the protruded teeth 10a is deviated compared to the case of the first embodiment as described above, the step angle Q of the shaft 8 is deviated by one cycle of the generative torque.

By synthesizing the generative torque and the auxiliary torque, the detent torque shown in FIG. 7C is obtained. In this case, the step angle of the shaft 8 for the detent torque, that is, the step angle of the rotor 4 equals a rotation angle Z by the detent torque which is obtained by synthesizing the auxiliary torque and the generative torque because the former is slightly larger than the latter. Here, though the step angle Z equals the rotation angle V in FIG. 7A, the occurrence frequency of the step angle Z is half the occurrence frequency of the step angle V similarly to the case of the first embodiment.

Therefore, also by setting the position of the protruded teeth 10a as shown in FIG. 6, the maximum detent torque can be increased similarly to the case of the first embodiment.

Then, the second embodiment of the present invention is described below by referring to FIGS. 8 and 9. FIG. 8 shows a model diagram showing the positional relation between the pole teeth 12, 13, 14, and 15 formed on the stator cores 3a1, 2, 3b1, and 2 on one hand and the protruded teeth 10a on the other in the second embodiment. The second embodiment is obtained by arranging the second stator core 10 and forming the protruded teeth 10a on the inner circumference of the discold second stator core 10 similarly to the case of the first embodiment. The above positional relation in the second embodiment shown in FIG. 8 is set so that the step angle of the shaft 8 (rotor 4) when the stepping motor 50 is turned on equals the step angle of the shaft 8 when it is turned off in the case where the stepping motor 50 is operated by the two-phase excitation method.

As shown in FIG. 8, one of the protruded teeth 10a is arranged at mid-position between a predetermined pole tooth 21a in the pole teeth 12 of the first line and the predetermined pole tooth 30a in the pole teeth 15 of the second line. Moreover, one protruded tooth is arranged at mid-position between the predetermined pole tooth 20a in the pole teeth 13 and the predetermined pole tooth 31b in the pole teeth 14. Similarly, one protruded tooth is arranged at mid-position between a pole tooth 21b adjacent to the pole tooth 21a in the pole teeth 12 and the pole tooth 30b adjacent to the pole tooth 30a in the pole teeth 15. Moreover, one protruded tooth is arranged at mid-position between the pole tooth 20b adjacent to the pole tooth 20a in the pole teeth 13 and a pole tooth 31c adjacent to the pole tooth 31b in the pole teeth 14. Therefore, in the case of the second embodiment, one protruded tooth is arranged at mid-position between the closest pole teeth oriented in the same direction in each of the pole teeth 12 to 15 forming the first and second lines. That is, the closest pole tooth oriented in the same direction as the pole tooth 21a is 30a and the pole tooth closest to the pole tooth 31b is 20a. The protruded teeth 10a arranged at the above positions are formed on the second stator core 10 so that the interval between adjacent protruded teeth 10a is constant.

Functions and advantages of the second embodiment with the above constitution are described below. However, functions and advantages same as those of the first embodiment are not described in detail.

The torques generated by the protruded teeth 10a and the pole teeth 12 to 15 arranged as described in FIG. 8 and the detent torque obtained by synthesizing the torques are described below by referring to FIG. 9.

The generative torque generated by the pole teeth 12 to 15 is equal to those of the first embodiment and the shaft 8 is stopped at the rotation angle β when the stepping motor 50 is turned off as shown in FIG. 9A. The auxiliary torque generated by the protruded teeth 10a makes the shaft 8 stop at a step angle N, which is equal to the step angle β according to the generative torque by the pole teeth 12 to 15 as shown in FIG. 9B. In this case, the occurrence frequency of the step angle N is half the occurrence frequency of the step angle β according to the generative torque of the pole teeth 12 to 15.

Therefore, the detent torque obtained by synthesizing the generative torque by the pole teeth 12 to 15 and the auxiliary torque by the protruded teeth 10a is shown as FIG. 9C and the step angle of the rotor 2 becomes equal to a rotation angle W. In this case, it is found that the rotation angle W is in agreement with the step angle β when the stepping motor 50 is operated by means of two-phase excitation.

Therefore, the maximum detent torque can be increased similarly to the case of the first embodiment by setting the position of the protruded teeth 10a as described above when arranging the second stator core 10 in the case where the stepping motor 50 is operated by means of two-phase excitation.

Moreover, to operate the stepping motor 50 by means of two-phase excitation, it is possible to set the position of the protruded teeth 10a as shown in FIG. 10. That is, one protruded tooth 10a is arranged at mid-position between the pole teeth 20a and 30a in FIG. 10. Similarly, the protruded teeth 10a are arranged at mid-position between the pole teeth 21a and 31a, at mid-position between the pole teeth 21b and 31b, and at mid-position between the pole teeth 20b and 30b one each. That is, the protruded teeth 10a are arranged at mid-positions between the closest pole teeth oriented in the same direction in the pole teeth 12 to 15 one each.

The torques generated by the protruded teeth 10a and the pole teeth 12 to 15 arranged as shown in FIG. 10 and the detent torque obtained by synthesizing these torques are described below by referring to FIG. 11.

Similarly to the case of the above-mentioned embodiments, when the stepping motor 50 is turned off, the stepping motor 50 stops at the rotation angle β by the generative torque generated by the pole teeth 12 to 15 as shown in FIG. 11A. Moreover, as shown in FIG. 11B, the auxiliary torque generated by the protruded teeth 10a shows the same output as the auxiliary torque shown in FIG. 9B. As for the auxiliary torque shown in FIG. 11B, however, a step angle O of the stepping motor 50 is deviated by one cycle of the generative torque from the step angle N of the stepping motor 50 due to the auxiliary torque in FIG. 9B. This is because the arranged positions of the protruded teeth 10a described in FIGS. 10 and 8 in detail are deviated from each other by one cycle.

Therefore, in this case, the detent torque obtained by synthesizing the generative torque and the auxiliary torque is shown as FIG. 11C and a step angle of the shaft 8 is X. However, this is only a deviation of the reference position of the step angle about the stepping motor 50. That is, also by setting the protruded teeth 10a as described above, it is possible to obtain the same advantage as the case of the second embodiment.

Then, the third embodiment of the present invention is described below by referring to FIGS. 12 to 16. In the case of the above first and second embodiments, the protruded teeth 10a arranged so as to face the outer periphery of the permanent magnet 5 are formed on the inner circumference of the second stator core 10. On the other hand, in the case of the third embodiment, the protruded teeth 10a serving as auxiliary poles are integrated with the stator cores 3a2 and 3b1 having the pole teeth 12 and 14.

FIG. 12 is a block diagram showing the constitution of the stator cores 3a2 and 3b1 on which auxiliary poles (protruded teeth) 10a of the third embodiment is integrally formed, and FIG. 13 is a model diagram showing the basic pattern of the positional relation between the pole teeth and the protruded teeth 10a formed as shown in FIG. 12.

First, the positional relation among the pole teeth 12 and 13 in the first line, the pole teeth 14 and 15 in the second line, and the auxiliary poles 10a will be described. Also in the third embodiment, same positional difference as that of the first embodiment is present between the pole teeth 12 and 13 forming the first line and the pole teeth 14 and 15 forming the second line. Moreover, in the third embodiment, the number of the protruded teeth 10a equal to the number of magnetic poles of a permanent magnet are formed on the stator cores 3a2 and 3b1, and the position of the protruded teeth 10a is set so as to make the step angle of the shaft 8 when the stepping motor 50 is operated by means of two-phase excitation equal to the detent position of the shaft 8 when the stepping motor 50 is turned off.

As shown in FIG. 13, the protruded teeth 10a equal to the total number of the pole teeth 12 and 13 forming the first line, in other words, the total number of the pole teeth 14 and 15 forming the second line are formed. That is, the protruded teeth 10a equal to the number of magnetic poles of the permanent magnet 5 are formed. One of the protruded teeth 10a is formed at mid-position between a predetermined pole tooth 21a in the pole teeth 12 of the first line and the predetermined pole tooth 30a in the pole teeth 15 of the second line. Moreover, one auxiliary pole (one protruded tooth) is formed at mid-position between the predetermined pole tooth 20a in the pole teeth 13 and the predetermined pole tooth 31b in the pole teeth 14. Similarly, one protruded tooth is formed at mid-position between a pole tooth 21b adjacent to the pole tooth 21a in the pole teeth 12 and the pole tooth 30b adjacent to the pole tooth 30a in the pole teeth 15. Moreover, one protruded tooth is formed at mid-position between the pole tooth 20b adjacent to the pole tooth 20a in the pole teeth 13 and the pole tooth 31c adjacent to the pole tooth 31b in the pole teeth 14. Therefore, in the case of the third embodiment, auxiliary poles are formed at mid-positions between the closest pole teeth oriented in the same direction among the pole teeth 12 to 15 forming the first and second lines one each. That is, the closest pole tooth oriented in the same direction as the pole tooth 21a is 30a and the pole tooth closest to the pole tooth 31b is 20a. The protruded teeth 10a arranged at these positions are formed on each stator core so that the interval between adjacent protruded teeth 10a is constant.

FIG. 14 is a constitutional model diagram when forming the protruded teeth 10a positioned as described in FIG. 13 in detail on the stator core 3a2 and 3b1 separately.

In FIG. 14, a protruded tooth 10a1 formed between the pole teeth 21a and 30a is integrated with the stator core 3a2 and a protruded tooth 10a2 formed between the pole teeth 20a and 31b is integrated with the stator core 3b1. Similarly, a protruded tooth 10a1 formed between the pole teeth 21b and 30b is integrated with the stator core 3a2 and a protruded tooth 10a2 formed between the pole teeth 20b and 31c is integrated with the stator core 3b1. Therefore, the protruded teeth 10a positioned as described in FIG. 13 are formed alternately on and integrally with the stator cores 3a2 and 3b1 one each.

The constitution of the stator cores 3a2 and 3b1 on which the protruded teeth 10a are alternately and integrally formed is described below by referring to FIG. 12.

As shown in FIG. 12, because the protruded teeth 10a1 and 10a2 formed on the stator cores 32 and 3b1 are partly overlapped with the pole teeth 12 and 14. Therefore, a notch 40 is formed at the roots of the pole teeth 12 and 14 respectively. Thus, because the notch 40 is formed, the protruded teeth 10a1 and 10a2 are protruded so as to face the permanent magnet 5 of the rotor 4 without interfering with the pole teeth 12 and 14. The height of the protruded teeth 10a (10a1, 10a2) from the inner circumference of the stator cores 3a2 and 3b1 is set almost equally to the height of the pole teeth 12 and 14. Moreover, in the case of the third embodiment, it is possible to form the stator cores 3a1 and 3b2 into the same shape. By only combining the a set of the stator cores 3a2 and 3b1 having the protruded teeth 10a with a set of the stator cores 13 and 15 on which the protruded teeth 10a are not formed, it is possible to increase the detent torque as mentioned later. The protruded teeth 10a are arranged so as to face the permanent magnet 5 of the rotor 4 as shown in FIG. 15. That is, the protruded teeth 10a are arranged on magnetic poles N and S of the permanent magnet 5 one each and the interval between the protruded teeth 10a is constant. The tips of the protruded teeth 10a facing the permanent magnet 5 is formed into curved surface. Therefore, it is possible to receive magnetic flux from large area of the permanent magnet 5 at a right angle, and this is effective to increase the detent torque.

Functions and advantages of the third embodiment with the above constitution are described below. However, the functions and advantages overlapped with those of the above-mentioned embodiments are not described in detail.

The torques generated by the protruded teeth 10a and pole teeth 12 to 15 arranged as described in detail in FIGS. 12 and 15 and the detent torque obtained by synthesizing the torques are described below by referring to FIG. 16.

The generative torque generated by the pole teeth 12 to 15 are the same as those of the above-mentioned embodiments and the shaft 8 is stopped at the rotation angle β when the stepping motor 50 is turned off as shown in FIG. 16A.

The auxiliary torque generated by the protruded teeth 10a has a generation cycle two times longer than the generation cycle of the generative torque by the pole teeth 12 to 15. Therefore, the occurrence frequency of the step angle N of the shaft 8 due to the auxiliary torque generated by the protruded teeth 10a is half the occurrence frequency of the step angle β due to the generative torque by the pole teeth 12 to 15. Moreover, the auxiliary torque is slightly larger than the generative torque.

Therefore, the detent torque obtained by synthesizing the generative torque by the pole teeth 12 to 15 and the auxiliary torque by the protruded teeth 10a is shown as FIG. 16C and the step angle of the rotor 4 equals the rotation angle W.

Therefore, in the case of the third embodiment, the total number of the protruded teeth 10a formed on the stator cores 3a2 and 3b1 equals the number of the poles of the permanent magnet 5 similarly to the case of the above-mentioned embodiments and it is half the total number of the protruded teeth of a stepping motor according to the prior art.

Then, the fourth embodiment of the present invention is described below by referring to FIGS. 17 and 18.

The fourth embodiment is constituted by changing the distribution pattern for distributing the protruded teeth 10a to the stator core 3a2 of the first line and the stator core 3b1 of the second line in order to realize the arrangement pattern of the protruded teeth 10a described in FIG. 13.

That is, in the third embodiment, the protruded teeth 10a are formed by distributing them as described in FIG. 14. In the fourth embodiment, however, the protruded teeth 10a are formed and arranged as shown below.

In the case of the fourth embodiment, an auxiliary pole (protruded tooth) formed between the pole teeth 21a and 30a is integrated with the stator core 3b1 as the protruded tooth 10a2 and an auxiliary pole (protruded tooth) formed between the pole teeth 20a and 31b is integrated with the stator core 3a2 as the protruded tooth 10a1. Similarly, a protruded tooth formed between the pole teeth 21b and 30b is integrated with the stator core 3b1 and a protruded tooth formed between the pole teeth 20b and 31c is integrated with the stator core 3a2. Therefore, the protruded teeth 10a positioned as described in FIG. 13 are formed alternately on and integrally with the stator cores 3a2 and 3b1 one each. Therefore, in the case of the fourth embodiment, the distribution pattern of the protruded teeth 10a to each stator core when arranging the protruded teeth 10a is opposite to the previously-described distribution pattern in FIG. 14.

The constitution of the stator cores 3a2 and 3b1 with which the protruded teeth 10a are integrated is described below by referring to FIG. 17.

As shown in FIG. 17, the protruded tooth 10a1 integrated with the stator core 3a2 is formed at the left of the pole tooth 12 and the height of the protruded tooth 10a1 from the inner periphery of the stator core 3a2 is almost equal to that of the pole tooth 12. Moreover, the protruded tooth 10a2 integrated with the stator core 3b1 is similarly formed. That is, the stator cores 3a2 and 3b1 are formed into the same shape.

It is needless to say that the stepping motor 50 of the fourth embodiment in which the protruded teeth 10a are integrated with the stator cores 3a2 and 3b1 has the same advantage as the above embodiments.

Then, the fifth embodiment of the present invention is described below by referring to FIGS. 19 to 22.

First, the positional relation between the pole teeth 12 to 15 and the protruded teeth 10a of the fifth embodiment is described below. The positional difference between the pole teeth 12 and 13 forming the first line and the pole teeth 14 and 15 forming the second line is set to the same value as that of the above-mentioned first embodiment.

As shown in FIG. 20, the protruded teeth 10a equal to the total number of the protruded teeth 12 and 13 forming the first line, in other words, equal to the total number of the magnetic poles N and S of the permanent magnet 5 are formed also in the fifth embodiment similarly to the case of the above-mentioned embodiments. One of the protruded teeth 10a is formed at mid-position between a predetermined pole tooth 21a in the pole teeth 12 of the first line and the predetermined pole tooth 31a in the pole teeth 14 of the second line. Moreover, one of the protruded teeth 10a is formed at mid-position between the predetermined pole tooth 20a in the pole teeth 13 and the predetermined pole tooth 30b in the pole teeth 15. Similarly, one protruded tooth 10a is formed at mid-position between the pole tooth 21b adjacent to the pole tooth 21a in the pole teeth 12 and the pole tooth 31b adjacent to the pole tooth 31a in the pole teeth 14. Moreover, one protruded tooth 10a is formed at mid-position between the pole tooth 20b adjacent to the pole tooth 20a in the pole teeth 13 and the pole tooth 30b adjacent to the pole tooth 30a in the pole teeth 15. Therefore, in the fifth embodiment, the protruded teeth 10a are formed at mid-positions between the pole teeth oriented in the opposite direction among the pole teeth 12 to forming the first and second lines one each. The protruded teeth 10a arranged at the above positions are formed on each stator core 3a2 and 3b1 so that the interval between adjacent protruded teeth 10a is constant.

FIG. 21 shows a constitutional model diagram when forming the protruded teeth 10a positioned as described in FIG. 20 on the stator cores 3a2 and 3b1 separately.

As shown in FIG. 21, the protruded tooth 10a1 formed between the pole teeth 21a and 31a in FIG. 20 is integrated with the stator core 3a2. Moreover, the protruded tooth 10a2 formed between the pole teeth 20a and 30a is integrated with the stator core 3b1. Similarly, the protruded tooth 10a1 formed between the pole teeth 21b and 31b is integrated with the stator core 3a2 and the protruded tooth 10a2 formed between the pole teeth 20b and 30b is integrated with the stator core 3b1. Therefore, the protruded teeth 10a in FIG. 21 are integrated with the stator cores 3a2 and 3b1 every other protruded tooth 10a.

The constitution of the stator cores 3a2 and 3b1 on which the protruded teeth 10a are integrally formed as described in FIG. 21 is described below by referring to FIG. 19.

As shown in FIG. 19, the protruded tooth 10a1 formed on the stator core 3a2 is partly overlapped with one of the pole teeth 12 in their forming position. Therefore, a recess 41 is formed at the roots of the pole teeth 12 to form the protruded tooth 10a1 so as to face the permanent magnet 5 of the rotor 4 without interfering with the pole teeth 12. Moreover, the protruded tooth 10a2 formed on the stator core 3b1 is formed between pole teeth 14. As shown in FIG. 19, in the case of the fifth embodiment, it is impossible to form the stator cores 3a2 and 3b1 into the same shape. Therefore, this embodiment is disadvantageous in this point compared to the above-mentioned embodiments.

Functions and advantages of the stepping motor 50 according to the fifth embodiment are described below. However, functions and advantages overlapped with those of the above embodiments are not described in detail.

The torques generated by the protruded teeth 10a and the pole teeth 12 to 15 arranged as described in FIGS. 19 and 21 and the detent torque obtained by synthesizing these torques are described below by referring to FIG. 22.

The generative torque generated by the pole teeth 12 to 15 is equal to that of the above embodiments, when the stepping motor 50 is turned off, the stepping motor 50 is stopped at the rotation angle β as shown in FIG. 22A.

Figure 39:
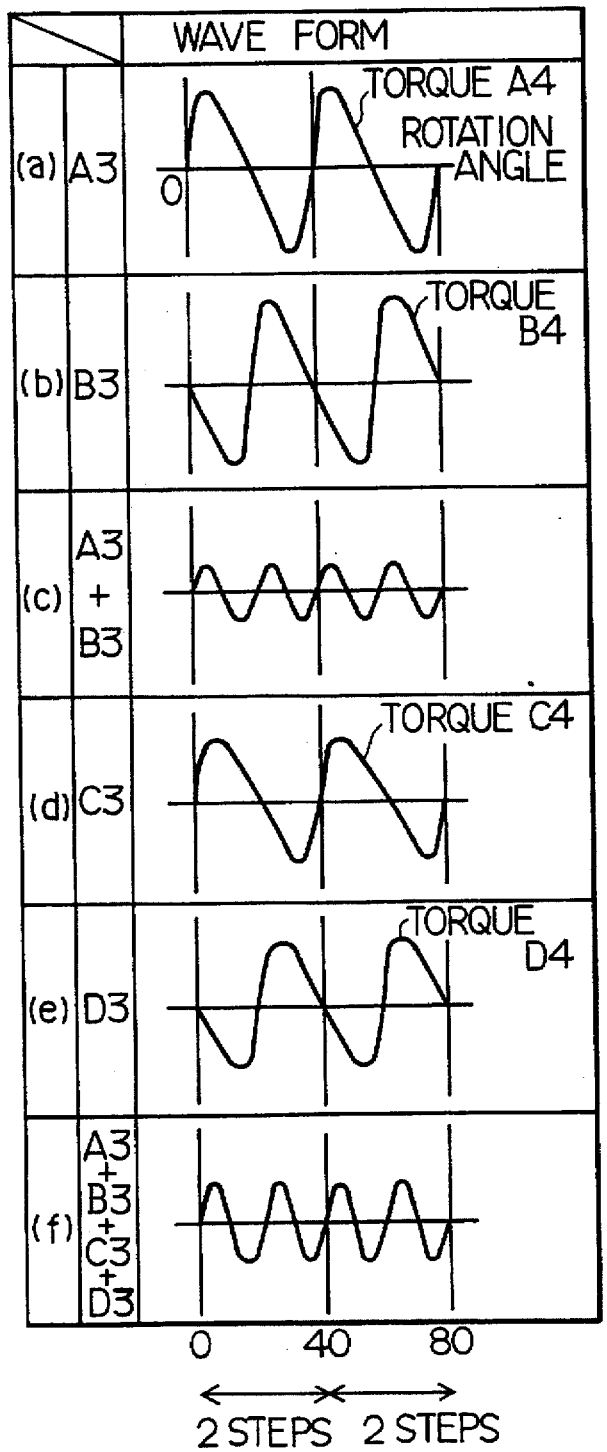

Moreover, similarly to the case of the fourth embodiment, the generation cycle of the auxiliary torque generated by the protruded teeth 10a is two times longer than the generation cycle for the stepping motor in FIGS. 37 to 39 described in the "Related Art". Furthermore, the step angle O of the stepping motor 50 due to the auxiliary torque in the fifth embodiment is deviated by a half cycle from the step angle N of the stepping motor 50 due to the auxiliary torque of the third embodiment shown in FIG. 16. This is because the arrangement positions of the protruded teeth 10a in the fifth embodiment is deviated just by a half cycle from the arrangement positions of the protruded teeth 10a in the third embodiment.

Therefore, the detent torque obtained by synthesizing the generative torque and the auxiliary torque is shown as FIG. 22C and the step angle of the stepping motor 50 comes to X. However, this is only a deviation of the reference position of the step angle about the stepping motor 50. Therefore, the performance of the stepping motor 50 is not affected. Moreover, though the stator cores 3a2 and 3b1 cannot be formed into the same shape, the fifth embodiment shows the same advantages as those described in detail in the above embodiments except the above point.

Then, the sixth embodiment of the present invention is described below by referring to FIG. 23.

The stator core shown in FIG. 23 is obtained by integrating all the protruded teeth 10a with the stator core 3a2 in accordance with the arrangement pattern of the protruded teeth 10a shown in FIG. 13 though the protruded teeth 10a are divided to the stator cores 3a2 and 3b1 in the fourth and fifth embodiments. Moreover, it is a matter of course that all the protruded teeth 10a can be integrated with the stator core 3b1. Thus, when integrating the protruded teeth 10a with one stator core, a large magnetomotive force can be received from the permanent magnet 5 by forming the protruded teeth 10a on one of stator cores 3a2 and 3b1 arranged around the center of the cylindrical height of the permanent magnet 5, and this is effective to increase the detent torque. In this case, the forming position of the protruded teeth 10a is overlapped with that of the pole teeth 12 every other protruded tooth 10a. Therefore, a deformed portion 42 is formed at the roots of the pole teeth 12 of the stator core 3a2. Moreover, the protruded teeth 10a are protruded at the deformed portion 42 and between each pole teeth 12 one each.

However, when it is enough that a torque equal to or more than a predetermined value can be generated, if the above torque can be obtained by the detent torque to be generated when the protruded teeth 10a are formed on the stator core 3a1 or 3b2, it is possible to integrate the protruded teeth 10a with the stator core 3a1 or 3b2.

The same advantages as the above embodiments can be obtained also from the stepping motor 50 in which the protruded teeth 10a are integrated with only the stator core 3a2.

The seventh embodiment of the present invention is described below by referring to FIGS. 24 to 27.

FIG. 24 shows a perspective diagram showing the constitution of the stator core 3a2 with which the protruded teeth 10a of the seventh embodiment are integrated and FIG. 25 is a model diagram showing the basic pattern of the positional relation between the pole teeth 12 to 15 and the protruded teeth 10a formed as shown in FIG. 24.

First, the positional relation among the pole teeth 12 and 13 forming the first line, the pole teeth 14 and 15 forming the second line, and the protruded teeth 10a is described below. Also in the seventh embodiment, the same positional difference as that of the first embodiment is present between the pole teeth 12 and 13 forming the first line and the pole teeth 14 and 15 forming the second line similarly to the case of the above embodiments. Moreover, for the seventh embodiment, the number of the protruded teeth 10a is made equal to the number of magnetic poles of the permanent magnet 5, the stepping motor 50 is operated by means of one-phase excitation, and the protruded teeth 10a are positioned so as to make the detent position of the rotor 4 when the motor 50 is turned on coincide with the detent position of the rotor 4 when the motor 50 is turned off.

As shown in FIG. 25, the protruded teeth 10a equal to the total number of the protruded teeth 12 and 13 (14 and 15) are formed, in other words, they are formed for N and S poles of the permanent magnet 5 one each. One of the protruded teeth 10a is integrated with the stator core 3a2 at the same position as the predetermined pole tooth 30a in the pole teeth forming the second line. Moreover, a protruded tooth next to the above protruded tooth is integrated with the stator core 3a2 at the same position as the pole tooth 31b adjacent to the pole tooth 30a of the second line. Furthermore, a protruded tooth next to the protruded tooth is integrated with the stator core 3a2 at the same position as the pole tooth 30b adjacent to the pole tooth 31b. However, no protruded tooth is formed on the stator core 3b1. Furthermore, the protruded teeth 10a are arranged so as to face the permanent magnet 5 of the rotor 4 as shown in FIG. 26.

The protruded teeth 10a positioned as shown in FIG. 25 are integrated with the stator core 3a2 as shown in FIG. 24. The constitution of the stator core 3a2 is described below by referring to FIG. 24.

As shown in FIG. 24, all the protruded teeth 10a are integrated with the stator core 3a2. That is, the protruded teeth 10a are formed at the both sides of all pole teeth 12 formed on the stator core 3a2. The height of the protruded teeth 10a from the inner circumference of the stator core 3a2 is almost equal to the height of the pole teeth 12.

Functions and advantages of the seventh embodiment using the stator core 3a2 with the above constitution are described below. However, descriptions overlapped with those of the above embodiments are omitted.

The generative torque generated by the pole teeth 12 to 15, the auxiliary torque generated by the protruded teeth 10a, and the detent torque obtained by synthesizing the above torques in the stepping motor 50 of the seventh embodiment are described below by referring to FIG. 27.

The generative torque generated by the pole teeth 12 to 15 forming the first and second lines is shown as FIG. 27A. A step angle when power is off due to the generative torque equals the rotation angle β. However, the rotation angle β is a detent position when the stepping motor 50 is operated by means of two-phase excitation. Therefore, the detent position when the stepping motor 50 is turned off is forcibly set to the detent position V when the stepping motor 50 is operated by means of one-phase excitation.

For this object, a torque slightly larger than the generative torque is generated so that the step angle is made equal to the rotation angle V by the torque. Therefore, the protruded teeth 10a positioned as described above generate an auxiliary torque for the step angle of the shaft 8 to become P as shown in FIG. 27B.

By synthesizing the above generative torque and the auxiliary torque, the detent torque shown in FIG. 27C is obtained. In this case, the detent position of the rotor 4 due to the detent torque, that is, the step angle of the stepping motor 50 comes to a rotation angle Y because the auxiliary torque is slightly larger than the generative torque. In this case, though the rotation angle Y equals the step angle V in FIG. 27A, the occurrence frequency of the rotation angle Y is half the occurrence frequency of the step angle V. By equalizing the detent position of a stepping motor 50 to be operated by means of one-phase excitation when the motor is turned off with the detent position of the motor when it is turned on, it is possible to equalize the opening degree of an actuator (e.g. a valve for connecting or disconnecting a brake pipe) of an anti-skid controller to be operated by a stepping motor when the stepping motor is turned on with the opening degree of the actuator when the motor is turned off. This is effective to control the actuator.

The same advantages as those of the above embodiments can be obtained also from the stepping motor 50 of the seventh embodiment.

Then, the eighth embodiment of the present invention is described below by referring to FIGS. 28 to 30.

The eighth embodiment of the present invention is constituted by changing the setting position pattern of the protruded teeth 10a in the seventh embodiment.

That is, as shown in FIG. 29, the protruded teeth 10a are integrated with the stator core 3a2 at the same position as the pole teeth 12 and 13 forming the first line. It is also possible to integrate the protruded teeth 10a with the stator core 3b1.

The protruded teeth 10a thus positioned is integrated with the stator core 3a2 as shown in FIG. 28. The constitution of the stator core 3a2 is described below by referring to FIG. 28.

As shown in FIG. 28, all the protruded teeth 10a are integrated with the stator core 3a2. In this case, the forming position of the protruded teeth 10a is overlapped with that of the pole teeth 12 every other protruded tooth 10a. Therefore, hollow portions 43 are formed at the roots of the pole teeth 12 so that the protruded teeth 10a are protruded therefrom. Each of other protruded teeth is arranged at the lateral of the pole tooth 12. The height of the protruded teeth 10a from the inner circumference of the stator core 3a2 is almost equal to the height of the pole teeth 12.

Functions and advantages of the eighth embodiment using the stator core 3a2 with the above constitution are described below. However, descriptions overlapped with those of the above embodiments are omitted.

The generative torque generated by the pole teeth 12 to 15, the auxiliary torque generated by the protruded teeth 10a, and the detent torque obtained by synthesizing the above torques in the stepping motor 50 of the eighth embodiment are described below by referring to FIG. 30.

Though the generative torque generated by the pole teeth 12 to 15 forming the first and second lines is shown as FIG. 30A, it is not described in detail because it is the same as that in FIG. 27A.

The auxiliary torque generated by the protruded teeth 10a positioned as described above is shown as FIG. 30B and the step angle of the shaft 8 due to the auxiliary torque is Q. Because the arrangement position of the protruded teeth 10a is deviated for the eighth embodiment compared to the case of the seventh embodiment as described above, the rotation angle Q of the shaft 8, that is, the rotation angle Q of the stepping motor 50 is deviated by a half cycle.

By synthesizing the above generative torque and the auxiliary torque, the detent torque shown in FIG. 30C is obtained. In this case, the step angle of the rotor 4, that is, the step angle of the stepping motor 50 comes to the rotation angle Z because the auxiliary torque is slightly larger than the generative torque. In this case, though the step angle Z equals the rotation angle V in FIG. 30A, the occurrence frequency of the step angle Z is half the occurrence frequency of the rotation angle V.

The same advantages as those of the above embodiments can be obtained also from the stepping motor 50 of the eighth embodiment.

Then, the ninth embodiment of the present invention is described below by referring to FIGS. 33 and 34.

The ninth embodiment is constituted by distributing the protruded teeth 10a to the stator cores 3a2 and 3b1 in order to realize the position setting pattern of the protruded teeth 10a of the eighth embodiment.

That is, as shown in FIG. 31, the protruded tooth 10a1 of the protruded teeth 10a formed at the same position as the pole teeth 12 of the first line is integrated with the stator core 3a2. The protruded tooth 10a2 formed at the same position as the pole teeth 13 of the first line is integrated with the stator core 3b1.

The stator cores 3a2 and 3b1 with the protruded teeth 10a integrally formed on them are constituted as shown in FIG. 32. In this case, it is needless to say that the stator core 3a2 with the protruded tooth 10a1 formed on it excludes the protruded tooth formed between the pole teeth 12 of the stator core 3a2 of the eighth embodiment. Moreover, the notch 40 is formed on the stator core 3b1 as shown in FIG. 32 in order to prevent the protruded tooth 10a2 from interfering with the pole tooth 14. In the case of the ninth embodiment, the stator cores 3a2 and 3b1 are not formed into the same shape.

FIGS. 33 and 34 show the tenth embodiment of the present invention.

The tenth embodiment is constituted by distributing the protruded teeth 10a to the stator cores 3a2 and 3b1 in the position setting pattern of the protruded teeth 10a of the eighth embodiment in the opposite way to the case of the ninth embodiment.

That is, as shown in FIG. 33, a protruded tooth 10a2 formed at the same position as the pole teeth 12 of the first line is integrated with the stator core 3b1. Moreover, a protruded tooth 10a1 formed at the same position as the pole teeth 13 of the first line is integrated with the stator core 3a2.

The stator cores 3a2 and 3b1 with which the protruded teeth 10a are integrated are constituted as shown in FIG. 34. In this case, it is needless to say that the stator core 3a2 with the protruded tooth 10a1 formed on it excludes the protruded tooth formed in the hollow portion 43 of the pole tooth 12 of the stator core 3a2 in the ninth embodiment. Moreover, the notch 40 is formed on the stator core 3b1 as shown in FIG. 34 in order to prevent the protruded tooth 10a2 from interfering with the pole teeth 14. As for the tenth embodiment, it is impossible to form the stator cores 3a2 and 3b1 into the same shape.

The present invention is not limited to the above embodiments but it allows various modifications as shown below.

That is, in the fourth and fifth embodiments, the protruded teeth 10a are distributed to the stator cores 3a2 and 3b1 and integrated with them respectively. However, it is also possible to integrate the protruded teeth 10a with one stator core. Moreover, though the protruded teeth 10a are distributed to two stator cores in the above embodiments, it is possible to distribute them to three stator cores or more. In this case, it is preferable to distribute two adjacent protruded teeth to each stator core as shown in FIG. 13. That is, if the protruded teeth 10a are distributed to three stator cores or more, it may not be possible to generate a large detent torque because the distance between the protruded teeth 10a increases and thereby a magnetic circuit for generating an auxiliary torque by the protruded teeth 10a is weakly effected (that is, the magnetic flux density decreases). However, by forming two adjacent protruded teeth 10a on each stator core, a complete magnetic circuit is formed between the two protruded teeth and a large detent torque can be generated.

Moreover, in the above embodiments, the notch 40, recess 41, or deformed portion 42 is formed at the roots of the pole teeth 12 and 14 when the forming position of the protruded teeth 10a interferes with that of the pole teeth 12 and 14. However, it is also possible to disuse the above notch 40 by decreasing the width of the pole teeth 12 and 14 or that of the protruded teeth 10a.

Furthermore, though the height of each protruded tooth 10a is made almost equal to the height of each of the pole teeth 12 to 15, that is, the interval between the permanent magnet 5 and the pole teeth and that between the permanent magnet 5 and the protruded teeth are almost equalized, however, it is also possible to set them as shown below. That is, it is possible to increase the protrusion height of the protruded teeth 10a and set the protruded teeth 10a so as to approach the permanent magnet 5 of the rotor 4. In this case, it is possible to increase the auxiliary torque generated by the protruded teeth 10a. Moreover, it is possible to decrease the protrusion height of the protruded teeth 10a and set the protruded teeth 10a so as to go away from the permanent magnet 5 of the rotor 4. In this case, it is possible to decrease the auxiliary torque generated by the protruded teeth 10a.

To adjust the auxiliary torque generated by the protruded teeth 10a, the following method can be used. That is, it is possible to adjust the auxiliary torque by flattening the faces of the protruded teeth 10a facing a permanent magnet and changing the area of the faces facing the permanent magnet, though the faces of the protruded teeth 10a facing a permanent magnet are formed into curved surfaces for the above embodiments. In this case, it is possible to maximize the auxiliary torque when the ratio between the area of the protruded teeth 10a facing a magnetic pole and the area of a magnetic pole of a permanent magnet becomes a predetermined value. Therefore, it is possible to adjust the auxiliary torque by changing the area of the protruded teeth 10a to change the ratio. Moreover, when forming the faces of the protruded teeth 10a facing a permanent magnet into curved surfaces, it is possible to adjust the auxiliary torque by changing the width of the protruded teeth 10a and thereby changing the area of the curved surfaces.

Moreover, it is possible to apply the stepping motor 50 of the present invention to an actuator 60 shown in FIG. 35 for independently controlling damping forces of suspensions for four wheels. FIG. 35 shows a front view of an actuator 60 of an shock absorber and FIG. 36 shows a longitudinal sectional view of the actuator 60 when the stepping motor 50 is applied thereto.

FIG. 35 shows the outline of a frame case 51 in which the stepping motor 50 and an electric circuit 53 for controlling the stepping motor 50 are built. A connector 52 for executing electrical connection with an external unit is also built in the case 51.

FIG. 36 shows a sectional view of the actuator 60. The electric circuit 53 is independently set to each stepping motor 50 provided correspondingly to each suspension of a vehicle. The actuator 60 with the above constitution is disposed onto the shock absorber of the suspension for each wheel and the driving force from the stepping motor 50 is transmitted via a not-illustrated control rod.

In this case, a terminal mounting section 54 is arranged which is integrated with a spool for holding an exciting coil by forming a notch on the second stator core 10 so as to realize connection with the electric control circuit 53.

Therefore, by using each stepping motor 50 of the present invention with a large detent torque correspond to the electronic control circuit 53 for four-wheel independent suspension control, it is possible to improve the accuracy of suspension control. For such a large detent torque under power off, it is possible to keep the damping-force constant even when electric power is not supplied to the electronic control circuit 53 and thereby avoid extra power consumption.

What is claimed is:

1. A polyphase stepping motor comprising:
   a rotor provided with a cylindrical permanent magnet an outer periphery of which is alternately magnetized into N and S poles and which is rotatably supported;
   first and second hollow discoid stator cores having first and second groups of pole teeth, respectively, which are arranged in an inner circumference thereof, respectively, so as to face said outer periphery of said permanent magnet at predetermined intervals, and to make a first-line of pole teeth in which said pole teeth of said first group and said pole teeth of said second group are interleaved;
   a first exciting coil for magnetizing said pole teeth of said first-line pole teeth when it is turned on in order to rotate said rotor;
   third and fourth hollow discoid stator cores having third and fourth groups of pole teeth, respectively, which are arranged in an inner circumference thereof, respectively, so as to face said outer periphery of said permanent magnet at predetermined intervals, to make a second-line of pole teeth in which said pole teeth of said third group and said pole teeth of said fourth group are interleaved, said third and fourth hollow discoid stator cores being positioned so that said pole teeth of said second-line of pole teeth have predetermined phase differences in a circumferential direction from said pole teeth of said first-line of pole teeth;
   a second exciting coil for magnetizing said pole teeth of said second-line of pole teeth when it is turned on in order to rotate said rotor; and
   at least two protruded teeth serving as auxiliary poles arranged so as to face said outer periphery of said permanent magnet to generate a detent torque by being magnetized by said permanent magnet when said first and second exciting coils are turned off,
   wherein each of said protruded teeth is arranged so as to face corresponding one of neighboring N and S poles of said outer periphery of said permanent magnet in order to make a magnetic flux path for increasing said detent torque.

2. A stepping motor according to claim 1, wherein said protruded teeth equal to the number of magnetic poles of said permanent magnet are arranged.

3. A stepping motor according to claim 2, wherein said protruded teeth are arranged so that the interval between adjacent protruded teeth is almost constant.

4. A stepping motor according to claim 1, wherein the width of said protruded teeth in the circumferential direction of said permanent magnet is smaller than that of each magnetic pole of said permanent magnet.

5. A stepping motor according to claim 1, wherein said protruded teeth are arranged around the center of the cylindrical height of said permanent magnet.

6. A stepping motor according to claim 1, further comprising a fifth hollow discoid stator core made of a magnetic material and arranged to be sandwiched between one of said first and second hollow discoid stator cores and one of said third and fourth hollow discoid stator cores,
   wherein said protruded teeth are formed at an inner circumference of said fifth hollow discoid stator core.

7. A stepping motor according to claim 6, wherein said protruded teeth of said fifth stator core are arranged at mid-position between the closest pole teeth oriented in the same direction in said first-line pole teeth and said second-line pole teeth.

8. A stepping motor according to claim 6, wherein said protruded teeth of said fifth stator core are arranged at mid-position between the closest pole teeth oriented in the opposite direction in said first-line pole teeth and said second-line pole teeth.

9. A stepping motor according to claim 6, wherein the positions of said protruded teeth of said fifth stator core coincide with the positions of the pole teeth in either side of said first-line pole teeth and said second-line pole teeth.

10. A stepping motor according to claim 1, wherein said protruded teeth are integrated with at least one of said stator cores.

11. A stepping motor according to claim 10, wherein said first-line of pole teeth is formed by interleaving pole teeth directed in opposite directions formed on said first and second stator cores respectively and said second-line of pole teeth is formed by interleaving pole teeth directed in opposite directions formed on said third and fourth stator cores respectively, and said protruded teeth are integrated with at least one of a stator core between said first and second stator cores, which is arranged at a position close to said third and fourth stator cores forming said second-line of pole teeth and a stator core between said third and fourth stator cores, which is arranged at a position close to said first and second stator cores, forming said first-line of pole teeth.

12. A stepping motor according to claim 10, wherein said first-line pole teeth is formed by interleaving pole teeth directed in opposite directions formed on said first and second stator cores respectively and said second-line pole teeth is formed by interleaving pole teeth directed in opposite directions formed on said third and fourth stator cores respectively, and said protruded teeth are divided and integrated in opposite directions formed on said third and fourth stator cores respectively, and said protruded teeth are integrated with at least one of a stator core between said first and second stator cores, which is arranged at a position close to said third and fourth stator cores forming said second-line of pole teeth and a stator core between said third and fourth stator cores, which is arranged at a position close to said first and second stator cores forming said first-line of pole teeth, respectively.

13. A stepping motor according to claim 11, wherein said protruded teeth are arranged at mid-position between the closest pole teeth oriented in the same direction in said first-line pole teeth and said second-line pole teeth.

14. A stepping motor according to claim 12, wherein said protruded teeth are arranged at mid-position between the closest pole teeth oriented in the same direction in said first-line pole teeth and said second-line pole teeth.

15. A stepping motor according to claim 11, wherein said protruded teeth are arranged at mid-position between the closest pole teeth oriented in the opposite direction in said first-line pole teeth and said second-line pole teeth.

16. A stepping motor according to claim 12, wherein said protruded teeth are arranged at mid-position between the closest pole teeth oriented in the opposite direction in said first-line pole teeth and said second-line pole teeth.

17. A stepping motor according to claim 11, wherein the positions of said protruded teeth coincide with the positions of the pole teeth in either of said first-line pole teeth and said second-line pole teeth.

18. A stepping motor according to claim 12, wherein the positions of said protruded teeth coincide with the positions of the pole teeth in either of said first-line pole teeth and said second-line pole teeth.

19. A stepping motor according to claim 1, wherein the portions of said protruded teeth facing said permanent magnet are formed into curved surfaces.

20. A stepping motor according to claim 1, wherein a detent torque generated by said protruded teeth is adjusted to any value by changing the area of the portion of the protruded tooth facing the permanent magnet.

21. A stepping motor according to claim 1, wherein a detent torque generated by said protruded teeth is adjusted to any value by setting the distance between the front end of said protruded teeth and the cylindrical surface of said permanent magnet to a desired value.

22. A stepping motor according to claim 1, wherein said pole teeth formed on said stator cores are pectinate.

* * * * *